(12) United States Patent
Golden et al.

(10) Patent No.: US 7,488,365 B2
(45) Date of Patent: Feb. 10, 2009

(54) FILTER ELEMENT USING CORRUGATED MEDIA SHEET

(75) Inventors: Patrick Golden, Roseville, MN (US); Michael A. Madden, Woodbury, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 235 days.

(21) Appl. No.: 10/497,092

(22) PCT Filed: Nov. 19, 2002

(86) PCT No.: PCT/US02/37200

§ 371 (c)(1),
(2), (4) Date: Jun. 15, 2005

(87) PCT Pub. No.: WO03/047722

PCT Pub. Date: Jun. 12, 2003

(65) Prior Publication Data

US 2005/0252182 A1    Nov. 17, 2005

Related U.S. Application Data

(60) Provisional application No. 60/337,230, filed on Dec. 3, 2001.

(51) Int. Cl.
*B01D 46/52* (2006.01)
*B01D 39/16* (2006.01)
*B01D 39/18* (2006.01)

(52) U.S. Cl. .............................. 55/521; 55/520; 55/527; 55/528; 210/493.4; 210/494.1; 210/505

(58) Field of Classification Search .................. 55/520, 55/521, 527, 528; 210/487, 493.4, 494.1, 210/497.1, 505, 508
See application file for complete search history.

(56) References Cited

U.S. PATENT DOCUMENTS 1,729,135 A    9/1929    Slauson (Continued)

FOREIGN PATENT DOCUMENTS

DE    671096    2/1939

(Continued)

OTHER PUBLICATIONS

Japanese Office Action with English Translation of Japanese Office Action; Patent Application No. 2003-548972; mailed Mar. 28, 2008; 3 pgs.

*Primary Examiner*—Duane Smith
*Assistant Examiner*—Robert A Clemente
(74) *Attorney, Agent, or Firm*—Merchant & Gould P.C.

(57) ABSTRACT

A corrugated web having tapered flutes is usable in straight-through flow filter elements. The corrugated web can be made by passage between a pair of corrugated rollers having tapered teeth. Methods of making usable corrugated rollers include methods for generating the tapered teeth at the end points and the extension between the end points. Corrugated webs may be made from a variety of media, including certain media that stretches in the machine direction. Methods of forming the corrugated web into filter elements (e.g., air filter elements) includes forming filter media by securing a flat sheet to the corrugated web. The filter media may then be wound into a filter element, including application of sealant during the winding process to close selected flutes.

28 Claims, 11 Drawing Sheets

U.S. PATENT DOCUMENTS

| | | | |
|---|---|---|---|
| 2,019,186 A | 10/1935 | Kaiser | |
| 2,038,071 A | 4/1936 | Wilhelm | |
| 2,190,886 A | 2/1940 | Schaaf et al. | |
| 2,397,759 A | 4/1946 | Sigmund | |
| 2,599,604 A | 6/1952 | Bauer et al. | |
| 2,887,177 A | 5/1959 | Mund et al. | |
| 3,020,977 A | 2/1962 | Huppke et al. | |
| 3,025,963 A | 3/1962 | Bauer | |
| 3,025,964 A | 3/1962 | Summers et al. | |
| 3,037,637 A | 6/1962 | Bub | |
| 3,070,937 A | 1/1963 | Bub | |
| 3,076,554 A | 2/1963 | Bub | |
| 3,112,184 A | 11/1963 | Hollenbach | |
| 3,112,262 A | 11/1963 | Parkinson | |
| 3,323,963 A | 6/1967 | Summers | |
| 3,346,121 A | 10/1967 | Bally | |
| 3,372,533 A | 3/1968 | Rummel | |
| 3,831,766 A | 8/1974 | Newman et al. | |
| 4,039,457 A | 8/1977 | Schacht et al. | |
| 4,119,543 A * | 10/1978 | Lawson et al. | 210/496 |
| 4,158,449 A | 6/1979 | Sun et al. | |
| 4,159,899 A | 7/1979 | Deschenes | |
| 4,162,906 A | 7/1979 | Sullivan et al. | |
| 4,181,513 A | 1/1980 | Fukuda et al. | |
| 4,225,642 A * | 9/1980 | Hirakawa | 55/528 |
| 4,310,419 A * | 1/1982 | Nara et al. | 210/493.4 |
| 4,410,427 A | 10/1983 | Wydeven | |
| 4,430,223 A | 2/1984 | Miyakawa et al. | |
| 4,439,321 A | 3/1984 | Taki et al. | |
| 4,441,899 A | 4/1984 | Takagi et al. | |
| 4,460,388 A | 7/1984 | Fukami et al. | |
| 4,504,290 A * | 3/1985 | Pontius | 96/153 |
| 4,537,608 A | 8/1985 | Koslow | |
| 4,589,983 A | 5/1986 | Wyevan | |
| 4,652,286 A | 3/1987 | Kusuda et al. | |
| 4,695,300 A | 9/1987 | Takagi | |
| 4,704,863 A | 11/1987 | Abthoff et al. | |
| 4,728,426 A | 3/1988 | Rudinger et al. | |
| 4,925,561 A | 5/1990 | Ishii et al. | |
| 5,015,379 A | 5/1991 | Drori | |
| 5,063,007 A | 11/1991 | Gabathuler et al. | |
| 5,066,432 A | 11/1991 | Gabathuler et al. | |
| 5,120,296 A | 6/1992 | Yamaguchi et al. | |
| 5,174,895 A | 12/1992 | Drori | |
| 5,316,676 A | 5/1994 | Drori | |
| 5,322,537 A | 6/1994 | Nakamura et al. | |
| 5,405,422 A | 4/1995 | Ueda et al. | |
| 5,405,423 A | 4/1995 | Haerle | |
| 5,512,075 A | 4/1996 | Ninomiya et al. | |
| 5,562,825 A | 10/1996 | Yamada et al. | |
| 5,820,646 A | 10/1998 | Gillingham et al. | |
| 5,902,364 A | 5/1999 | Tokar et al. | |
| D417,268 S | 11/1999 | Gillingham | |
| 6,179,890 B1 | 1/2001 | Ramos | |
| 6,235,195 B1 | 5/2001 | Tokar | |
| 6,350,291 B1 | 2/2002 | Gieseke et al. | |
| 7,070,640 B2 * | 7/2006 | Chung et al. | 55/487 |
| 7,090,712 B2 * | 8/2006 | Gillingham et al. | 55/486 |
| 2002/0185007 A1 | 12/2002 | Xu et al. | |
| 2003/0121845 A1 * | 7/2003 | Wagner et al. | 210/493.1 |

FOREIGN PATENT DOCUMENTS

| | | |
|---|---|---|
| EP | 0 630 672 A1 | 12/1994 |
| FR | 1193833 | 11/1959 |
| FR | 2148726 | 3/1973 |
| GB | 868058 | 5/1961 |
| GB | 1 579 883 | 11/1980 |
| JP | 60-112320 | 6/1985 |
| JP | 60-244318 | 12/1985 |
| JP | 61-011921 | 1/1986 |
| JP | 11-28811 | 5/1989 |
| JP | 1-171615 | 7/1989 |
| JP | 2-25009 | 2/1990 |
| JP | 60-47216 | 2/1994 |
| JP | 63-27910 | 11/1994 |
| JP | 10-140430 | 5/1998 |
| JP | 2000-034635 | 2/2000 |
| JP | 2000-509324 T | 7/2000 |
| WO | WO 97/40918 | 11/1997 |
| WO | WO 98/17368 | 4/1998 |

* cited by examiner

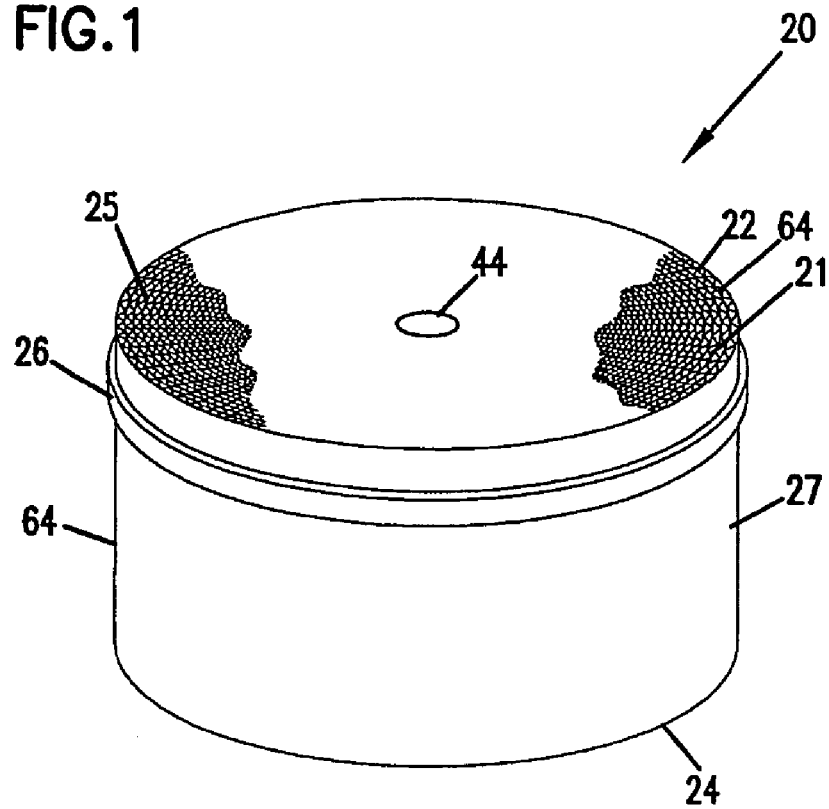
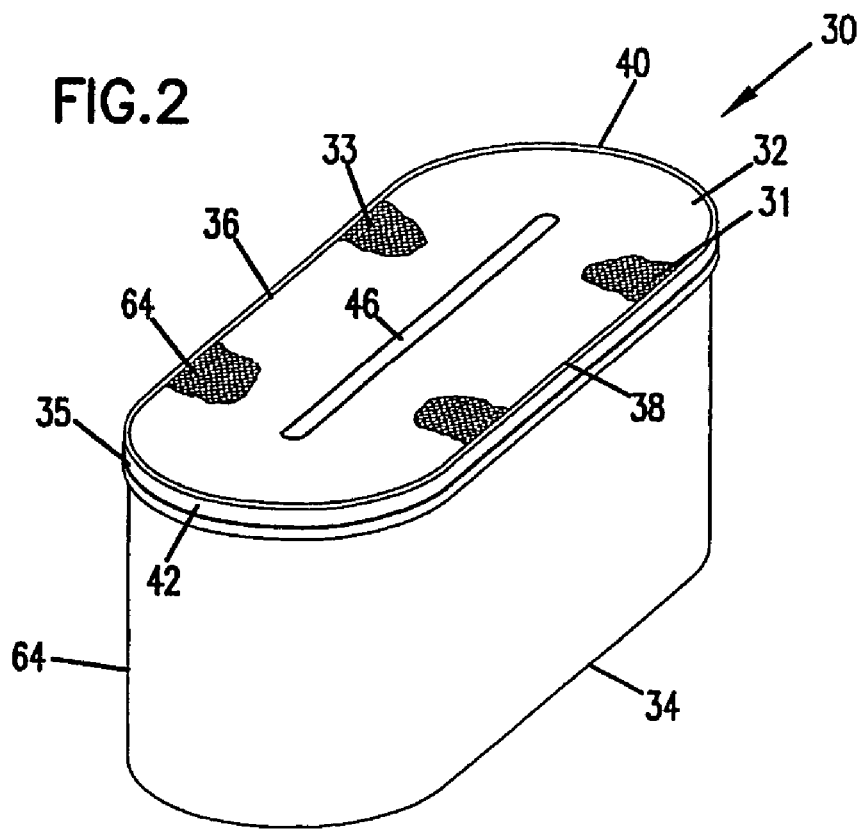

US 7,488,365 B2

FILTER ELEMENT USING CORRUGATED MEDIA SHEET

TECHNICAL FIELD

This disclosure relates in general to corrugated webs, methods of making corrugated webs, and filter elements. In particular, this disclosure relates to corrugated webs having tapered flutes, methods and equipment for making such corrugated webs, methods of constructing filter elements (e.g., air filter elements) from such corrugated webs, and the resulting filter elements.

BACKGROUND

Air streams often carry particulate material therein. In many instances, it is desirable to remove some or all of the particulate material from an air stream. For example, air flow stream to engines for motorized vehicles or to power generation equipment; gas streams directed to gas turbine systems; and air streams to various combustion furnaces, often include particulate material therein. Also, liquid streams into engine lube systems or hydraulic systems also carry particulate matter within it. If the particulate material reaches the internal workings of the various mechanisms involved, it can cause substantial damage to the equipment. Thus, it is preferred that for such systems, the particulate material be removed from the air or liquid flow upstream of the engine, turbine, furnace, or other equipment involved. A variety of air filter, fluid filter, and liquid filter arrangements have been developed for particulate removal. In general, however, continued improvements are sought.

SUMMARY OF THE DISCLOSURE

A corrugated web having tapered flutes is usable in many applications, including straight-through flow filter elements.

The corrugated web can be made by passage between a pair of corrugated rollers having tapered teeth. Methods of making usable corrugated rollers include methods for generating the tapered teeth at end points and on extension between the end points.

Corrugated webs may be made from a variety of media. Preferably, the media used is one that has some stretch in the machine direction.

Methods of forming the corrugated web into filter elements include forming filter media by securing a flat sheet to the corrugated web. The filter media may then be wound into a filter element, typically with application of sealant during the winding process to close selected flutes.

BRIEF DESCRIPTION OF THE DRAWINGS

FIG. 1 is a schematic, perspective view of a filter element utilizing fluted filter media, which can be constructed according to principles of this disclosure.

FIG. 2 is another schematic, perspective view of a filter element utilizing fluted filter media, which may be constructed according to principles of this disclosure.

DETAILED DESCRIPTION

Figure 3:
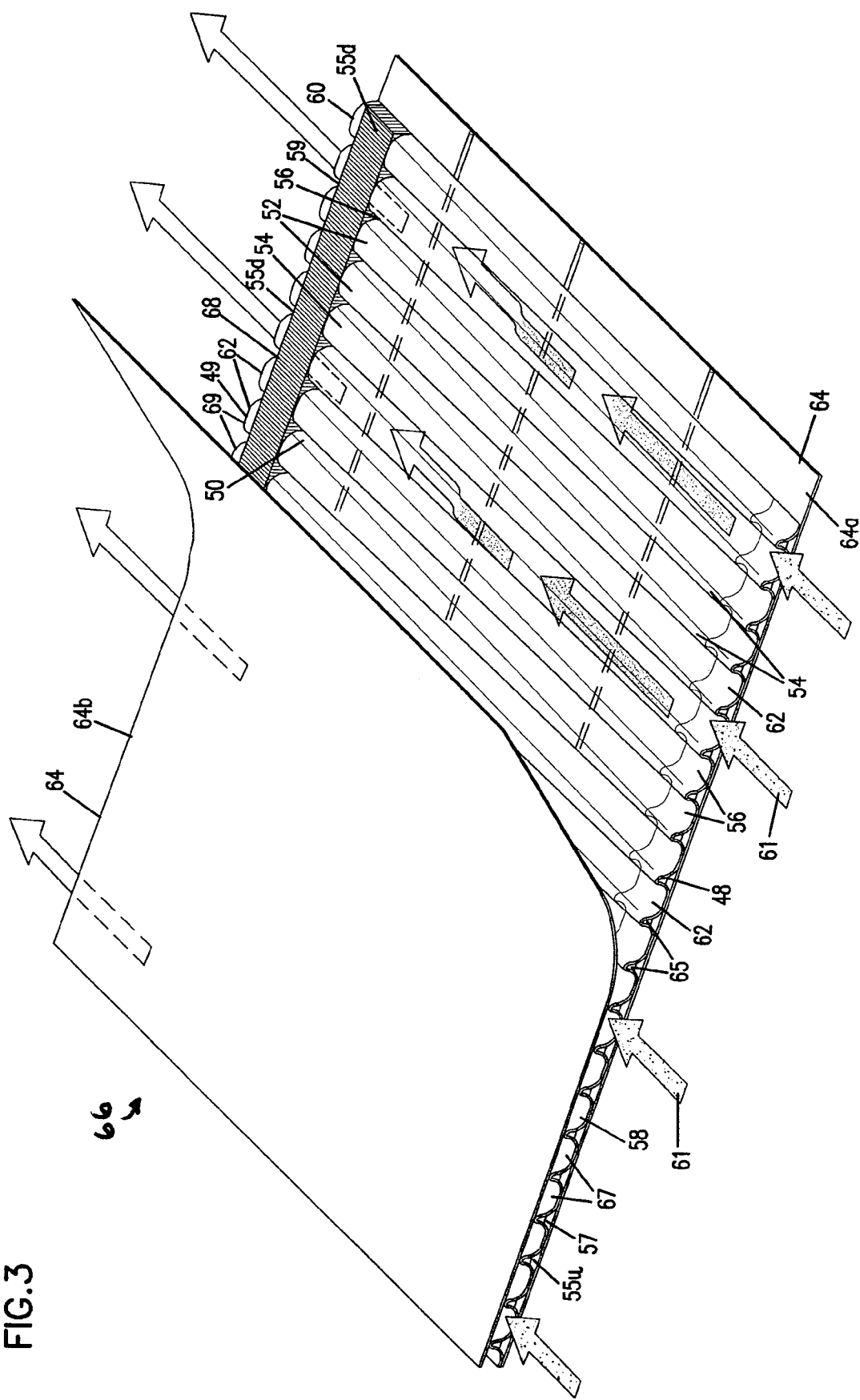
FIG. 3 is a schematic, perspective view of one approach to manufacturing filter media useable in the filter elements of FIGS. 1 and 2.

I. Some Principles Related to Filter Design

Filter elements utilizing fluted filter media, which accommodate straight through flow are known. Examples of some of these type of filter elements are shown in U.S. Pat. Nos. 6,190,432; 5,820,646; and PCT Publication WO 97/40918, published on Nov. 6, 1997. Each of these patents and publication is incorporated by reference herein. In these types of filter elements, a corrugated sheet or web of filter media is attached to a flat sheet or web of material to result in a corrugated substrate. In many instances, the corrugated substrate is coiled or wound into a desired resulting element shape. Each individual corrugation, or flute, has one end open and the opposite end closed. Fluid to be filtered passes into open ends of selected ones of the flutes in the filter element. The fluid cannot proceed directly to exit out of the particular flute that it entered, because that particular flute is closed at the downstream end. In order to exit the downstream end of the filter element, the fluid must pass through the media (either the flat web or the corrugated web) in order to get into a flute whose downstream end is open.

One example of a filter element utilizing a corrugated web secured to a flat web to form filter media 21 of material and wound into a filter element is shown in FIG. 1 at 20. In the example shown in FIG. 1, the filter element 20 includes opposite flow faces 22, 24 which, in this instance, are parallel. In alternate configurations, one of the flow faces 22 or 24 may not lie in a single plane, e.g., it may be conical. An example of a conically shaped filter element is shown in U.S. Des. 399,944, U.S. Des. 428,128, and U.S. Des. 396,098, each of which is incorporated by reference. The flow face 22 is shown schematically, with only portions showing end flutes 25, but it should be understood that the entire filter face 22 typically will show the end flutes. In use, fluid to be filtered enters the upstream flow face (in this instance, 22) and exits through the downstream flow face (in this instance, 24). The fluid generally flows in the same direction entering the upstream flow face 22 as it exits the downstream flow face 24, and thus, the filter element 20 is referred to as a "straight through flow" filter. As can be see in FIG. 1, the particular filter element 20 is round, in that it has a circular cross-section. When using the filter element 20 in an air cleaner system, the filter element 20 may be modified by placing the appropriate gaskets or other types of sealing members thereon. One example sealing gasket 26 is shown secured to an outer annular surface 27 of the filter element 20. The sealing gasket 26 shown includes foamed polyurethane and forms a seal with a housing by compression of the gasket 26 against the housing. Examples of useable sealing gaskets include the ones described in U.S. Pat. No. 6,190,432 and U.S. patent application Ser. No. 09/875,844, filed Jun. 6, 2001, and commonly assigned hereto. Each of these documents is incorporated by reference herein.

FIG. 2 illustrates another example of a filter element 30 utilizing a corrugated web secured to a flat web to form filter media 31 and wound into the filter element 30. As with the filter element 20 shown in FIG. 1, the filter element 30 has opposite flow faces 32, 34 to accommodate straight through gas flow. As with the FIG. 1 embodiment, this embodiment also shows the flow face 32 schematically, with only portions showing end flutes 33, but it should be understood that the entire filter face 32 typically will show the end flutes 33. The embodiment of FIG. 2 shows the filter element 30 as wound. Specifically, this particular filter element 30 has a cross-section in the shape of two parallel sides 36, 38 joined at their ends by curved portions 40, 42. The filter element 30 may include appropriate sealing members or gaskets, and in the example shown, does include the type of sealing member 35 described in U.S. Pat. No. 6,190,432 and incorporated by reference herein. This sealing member 35 includes polyurethane molded on a frame, secured to the element 30. A seal is formed with a housing by compression of the sealing member 35 against the housing. In each of the elements 20, 30, a central core 44, 46 is shown as having the media 21, 31 wound therearound. In many embodiments, the filter elements 20, 30 can be coreless. By "coreless", it is meant that the elements are absent a central mandrel, tube, stick, or other piece that media 21, 31 is wound around.

In many filter systems, it has been found that it is desirable to increase the open flute chambers on the upstream end, and thereby decrease the closed flute chambers on the upstream end. It has also been found desirable to increase the open flute chambers in the downstream end, and thereby decrease the closed flute chambers on the downstream end. By arranging the open and closed flutes in this way, the restriction introduced by the filter media is decreased over standard, straight fluted filter designs. By using flutes that taper in width from the upstream end to the downstream end, this desired effect can result. In other words, the channel forming the flute changes in dimension across the width, for example, as it extends from one end of the corrugated web used in the filter element to the other end of the corrugated web. The corrugated web may then be wound into a filter element with the narrow end of the flute channel closed on the upstream end, and with the wide end of the flute channel being open on the upstream end, One example of a tapered flute is described in commonly assigned PCT Publication WO 97/40918 published on Nov. 6, 1997, which publication is incorporated herein by reference. By "increase the open flute chambers", it is meant to increase the cross-sectional area of the open flute, with the cross-sectional area being the area defined under the corrugation and normal (orthogonal) to the direction of air flow. By "decrease the closed flute chambers", it is meant to decrease the cross-sectional area of the closed flute, with the cross-sectional area being the area defined under the corrugation and normal (orthogonal) to the direction of air flow.

Some known variables in filter design include air intake (rated flow); initial restriction; initial efficiency; average or overall operating restriction; overall efficiency; and filter service life. Each of these factors is briefly discussed below.

It is know that in the example of an internal combustion engine, the engine air intake need is a function of the engine size, i.e. displacement and RPM at maximum, full or rated load. While air intake need varies depending upon RPM, the air intake requirement is defined at a rated RPM. It is known that air cleaner overall efficiency is generally a reflection of the amount of filterable solids that pass into the air cleaner during use, and that are retained by the air cleaner. Initial efficiency is the measurable efficiency of the filter when it is first put on-line. Initial efficiency is often specified by the engine manufacturer or equipment manufacturer. It is known that restriction is the pressure differential across an air cleaner during operating. Known contributors to restriction include: the filter media through which the air is directed; duct size through which the air is directed; and structural features against or around which the air is directed as it flows through the air cleaner and into the engine. A typical operational lifetime for an air cleaner is the period of the time the air cleaner can operate in the system without reaching the limiting restriction.

In general, it is known that some of the principle variables of concern in air cleaner design in order to develop systems to meet the types of specifications discussed above include: filter media type, geometry, and efficiency; air cleaner shape and structure; and filter element size. Each of these factors is briefly discussed below.

For example, conventional cellulose fiber media or cellulose/synthetic blends of fiber media generally operates as barrier media. The operation of such media is through surface loading, i.e., when air is directed through the media, the surface of the media acts as a barrier, preventing passage of particulate material therethrough. In time, a dust cake builds on the surface of the media, increasing media efficiency. The porosity of the fiber construction is usually a factor in determining the efficiency, especially the initial efficiency. In time, the dust cake will affect the efficiency. In general, such media is often defined or specified by its permeability.

In some applications, it may be desirable to treat the media with "fine fiber", for example, fibers having a size (diameter) of 5 microns or less, and in some instances, submicron. Useable fine fiber is described in commonly assigned U.S. patent application Ser. No. 09/87,590, filed May 31, 2001, incorporated by reference herein. A variety of methods can be utilized for application of the fine fiber to the media. Some such approaches are characterized, for example, in U.S. Pat. No. 5,423,829, column 32, at lines 48-60. More specifically, such methods are described in U.S. Pat. Nos. 3,878,014; 3,676,242; 3,841,953; and 3,849,241, each of these patents being incorporated herein by reference. Trade secret approaches comprising fine polymeric fiber webs positioned over conventional media, previously practiced under trade secret by Donaldson Company under the designation ULTRA-WEB® may be used. With respect to the configuration of the corrugated web and methods for making the corrugated web, there is no particular preference for how the fine fibers are made and what particular method is used to apply the fine fibers. Also, with respect to the resulting filter elements and the methods for making such filter elements, there is no particular preference for how the fine fibers are made and what particular method is used to apply the fine fibers. The amount of fine fiber application typically will be a matter of choice based on efficiency desired.

With respect to media geometry, while pleated, cylindrical patterns have often been used, it has been found desirable in certain situations to use fluted constructions as generally described above. In pleated systems, too many pleats too close together can contribute to a shorter filter life because of pleat bunching or collapsing. When pleats get wet, for example, they have a tendency to collapse, which drives up the restriction. Using flute constructions, for example in the form of a corrugated web of media secured to a flat web of media and rolled into a filter element, results in uniform shape for the incoming air flow. This uniform shape contributes to a reliable structure, which will not have a tendency to collapse if it becomes wet. In general, parameters with respect to fluted media constructions include: corrugation shape, corrugation length; corrugation density (such as the number of corrugations per inch in the web); corrugation depth; and resulting filter element shape (for example, diameter if round). A principal factor regarding selecting media geometry is the total media surface area required for any given application or situation.

Air cleaner shape and structure are factors that frequently affect the manner in which air is directed against and through the media; the extent to which the mechanical equipment on either side of the media affect or contribute to restriction; and the extent to which the air being filtered is pre-filtered by a pre-cleaner upstream of the media.

Given all these known factors discussed above, when utilizing a fluted media filter, a filter designer can decide the desired shape for each end (upstream end and downstream end) for the corrugated sheet used in the fluted filter construction. The desired end shape will depend upon the desired corrugation density (corrugations per inch) and, when desiring the advantages from tapered flutes, will account for the desired taper as well as the desired length. The filter designer may take into account air intake, efficiency, restriction, desired life, air cleaner shape, etc. Once these variables are selected, the present disclosure concerns, among other things, apparatus and methods for producing the desired corrugated sheet that can then be made into the desired filter element.

II. An Example of a Useable Tapered Flute

In reference now to FIG. 3, one example of a corrugated web or "corrugated filter media structure" that is useable in filter constructions is shown in FIG. 3 at 50. "Corrugated filter media structure" can refer to the corrugated web 50 alone or filter elements of the type shown in FIGS. 1 and 2. The corrugated web 50 includes a plurality of corrugations 52 in the form of alternating peaks 54 and furrows or troughs 56. As can be seen in FIG. 3, the corrugation web 50 includes a first end edge 58 and an opposite, second end edge 60. In general, the corrugations 52 extend at least partially between the first end edge 58 and the second end edge 60. In some instances, the corrugations 52 may be pinched or crushed at their ends, depending upon the desired filter characteristics. When such a crush or pinch occurs, it preferably distorts at each of the end edges over no more than 10%, typically no more than over 8% of the entire length of the corrugation 52. By "pinch or crush", it is meant pinching, crushing, folding, or other distortions from a standard smooth corrugation shape. Examples of a crushed or pinched end include the shape shown in U.S. Pat. No. 5,562,825 to Yamada et al. and the shape shown in commonly assigned PCT Publication WO 97/40918 published on Nov. 6, 1997, each of which is incorporated by reference herein. As used herein, when the term "corrugation end" or "flute end" is used, it is referring to the normal shape of the corrugation or flute at the portion of the flute just before any sort of crushing, pinching, or distortion begins. In other words, the "flute end" or "corrugation end" does not include and is not referring to any portion of the flute that is pinched, crushed, or otherwise distorted. In the particular web shown in FIG. 3, the corrugations 52 extend completely along the length between the first end edge 58 and the second end edge 60. In alternate arrangements, the corrugations 52 may not extend the full length between end edges 58, 62. The ends of the flutes that are of a non-distorted shape (not pinched or crushed) are defined by reference numbers 48 and 49. In the example shown, the flute ends 48, 49 are even with the end edges 58, 62.

Still referring to FIG. 3, the corrugations 52 in the form of alternating peaks 54 and troughs 56 form a plurality of channels or flutes 62. In the example shown, the flutes 62 are tapered. By "tapered", it is meant that the width (the distance between adjacent walls forming the flute 62) is not constant—in the example shown, the trough 56 of each flute 62 decreases in width between adjacent peaks 54 from the first end edge 58 to the second end edge 60. Analogously, the peak 54 of each flute 62 increases in width between adjacent troughs 56 from the first end edge 58 to the second end edge 60. As is apparent from a review of FIGS. 3-6, the majority of the taper is between the adjacent walls forming the flute 62 and the base of the flute 62 remains constant without taper. As will be explained below, it is preferred that the height of each flute 62 is substantially constant and uniform throughout the flute length, with only minor variation possible due to tolerances, etc.

FIG. 3 also shows the corrugated web 50 secured to a flat web or face sheet 64. By "flat" it is meant that it is continued in a single plane—there is not a small fold, rib, or corrugation to it. In the FIG. 3 embodiment, two sections of the face sheet 64 are shown, 64a and 64b. Face sheet 64a is depicted under the corrugated web 50, and 64b is depicted on top of the corrugated web 50. In many typical constructions, the corrugated web 50 will be secured to the bottom face sheet 64a and wound around itself such that the bottom face sheet 64a will cover the top of the corrugated web 50. It should be understood that, in many embodiments, the face sheet 64a and 64b are the same sheet 64. The face sheet 64 can be seen in FIGS. 1 and 2 as being the outside sheet in each of the filter elements 20 and 30. Further, in FIGS. 1 and 2, the face sheet 64 can be seen between alternating rows of the corrugated web 50. In the element 20 and 30 in FIGS. 1 and 2, the elements 20, 30 include the single face sheet 64 and the single corrugated web 50 secured together and wound into a coil. The result is that the corrugated web 50 is bordered on both the top and bottom by the face sheet 64.

In the example shown in FIG. 3, the openings 65 defined between the peaks 54 adjacent to the first end edge 58 and the face sheet 64 are closed with a sealant 55u (to form an upstream seal 57) while the openings 67 created between the troughs 56 along the first end edge 58 and the face sheet 64 are open and unobstructed. Adjacent the second end edge 60, again, the openings 68 created between the peaks 54 and the face sheet 64 are closed with a sealant 55d (to form a downstream seal 59), while the openings 69 created between the troughs 56 and the face sheet 64a are open.

From a review of FIG. 3, the general principles of operation of a corrugated web 50 formed into filter media 66 can be appreciated. In general, fluid to be cleaned or filtered enters the filter media 66 along the first end edge 58 through the openings 67 (inlet flutes 62) created between the troughs 56 and the face sheet 64b. This is shown by arrow 61. The fluid cannot enter the flutes 62 in the space between the peaks 54 and the face sheet 64a because those openings 65 are closed with sealant 55u (although, it should be noted that the sealant 55u, in FIG. 3, is spaced a short distance from the edge 58, so the fluid can enter the portion of the flute 62 between the peaks 54 and face sheet 64a the short distance from the edge 58 until it is stopped or blocked by the sealant 55u). The fluid proceeds along the inlet flute 62 but is unable to exit the same inlet flute 62 which it entered because those flutes 62 have their ends closed with sealant 55d along the second end edge 60 (i.e., the portion 68 between the face sheet 64b and the peaks 54 along the second end edge 60 are closed.) The fluid is thus forced to flow through either a portion of the corrugated web 50 or the face sheet 64 in order to exit through an outlet flute 62 that is open along the second end edge 60. This is shown by arrow 63. In the example shown, this would be an outlet flute 62 that is open and unblocked in the region 69 between the trough 56 and the face sheet 64a along the second end edge 60. When the fluid flows through either the corrugated web 50 or the face sheet 64, it is at least partially cleaned of particulate material.

Figure 6:
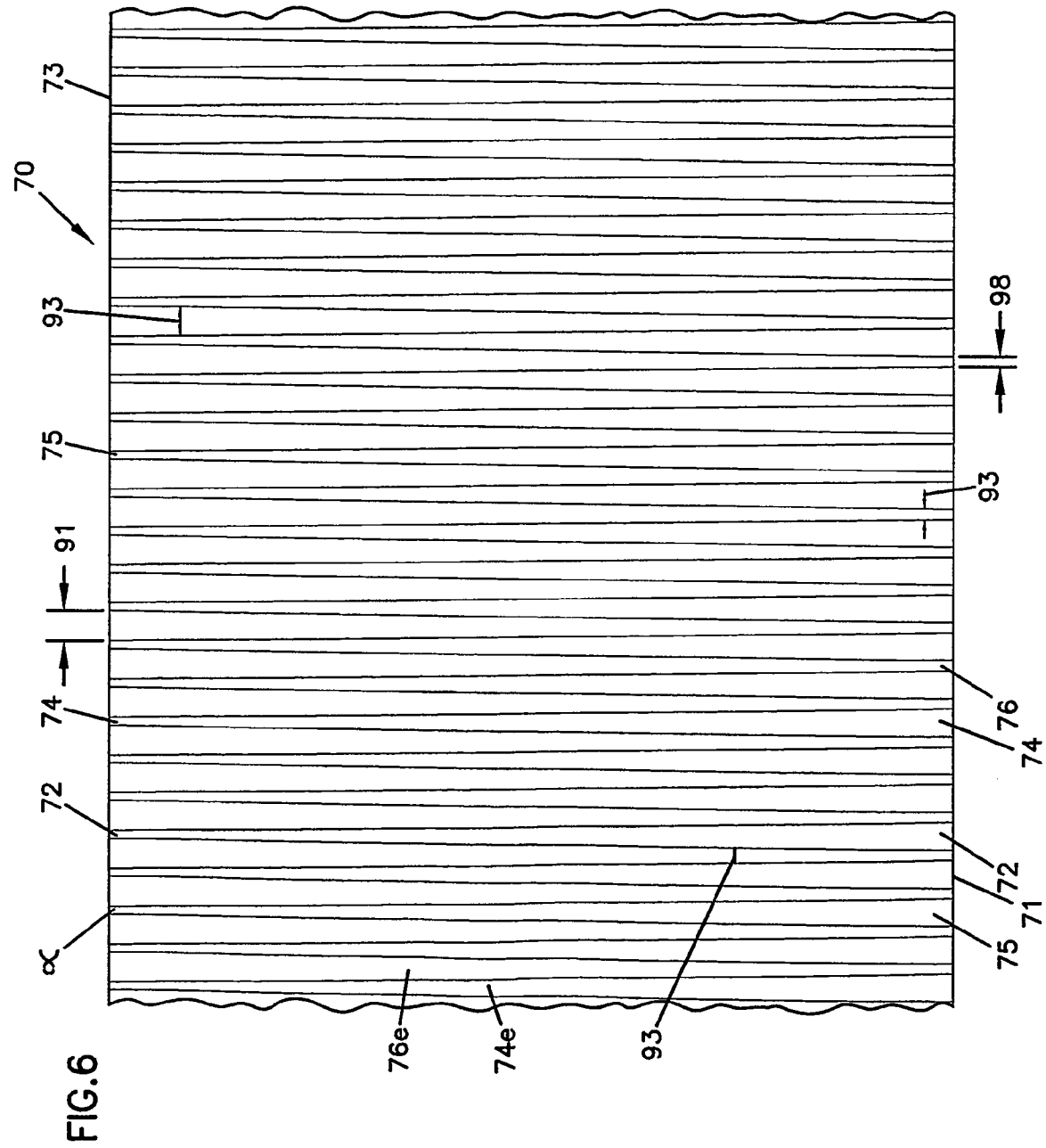
FIG. 6 is a top plan view of the corrugated web shown in FIGS. 4 and 5.
Figure 7:
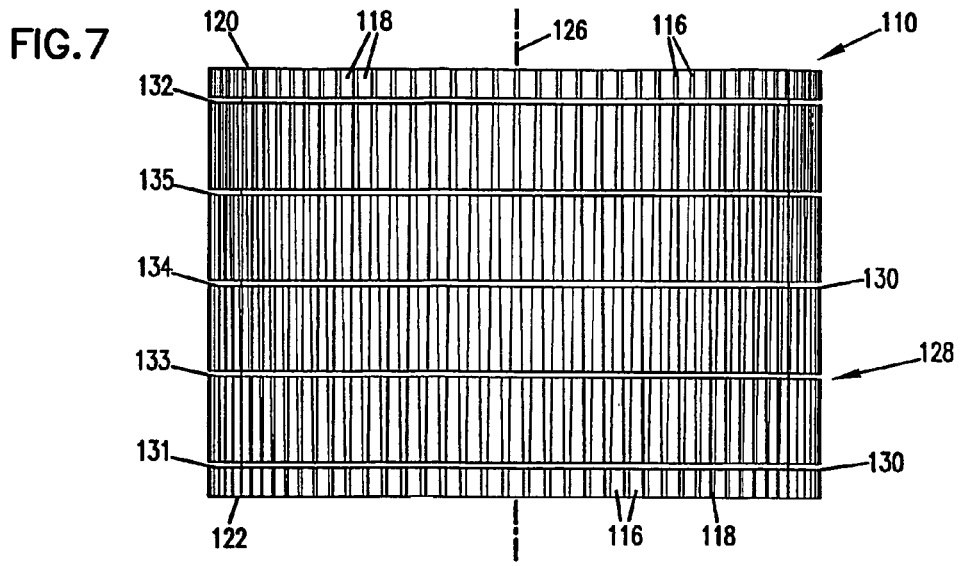
FIG. 7 is a side elevational view of one embodiment of a corrugation roller used to form the corrugated web shown in FIGS. 4-6.

The tapered flute 62 defines a cross-sectional shape that varies as it extends from the flute end 48 to the flute end 49. In general, the cross-sectional shape of the ends of the flute 62 will be selected based upon, at least in part, some of the factors described in Section I above. In reference now to FIG. 4, an enlarged view of one example of the corrugated web 50 is shown at 70 viewing the web 70 from an edge 71 (FIG. 6). For purposes of description, assume that the FIG. 4 view is the upstream edge of the web 70, when formed into a filter element. It should be understood that either edge 71 or 73 (FIG. 6) can be either the upstream or downstream edge. If fine fiber is used on the web 70, it will generally be preferred to have the fine fiber on the upstream side. (This is discussed further in Section IV, below.) It should be understood that instead of referring to "downstream" and "upstream" ends or edges, the terms "first" and "second" can be used for the edges 71, 73 and the corresponding peak and trough ends.

Figure 4:
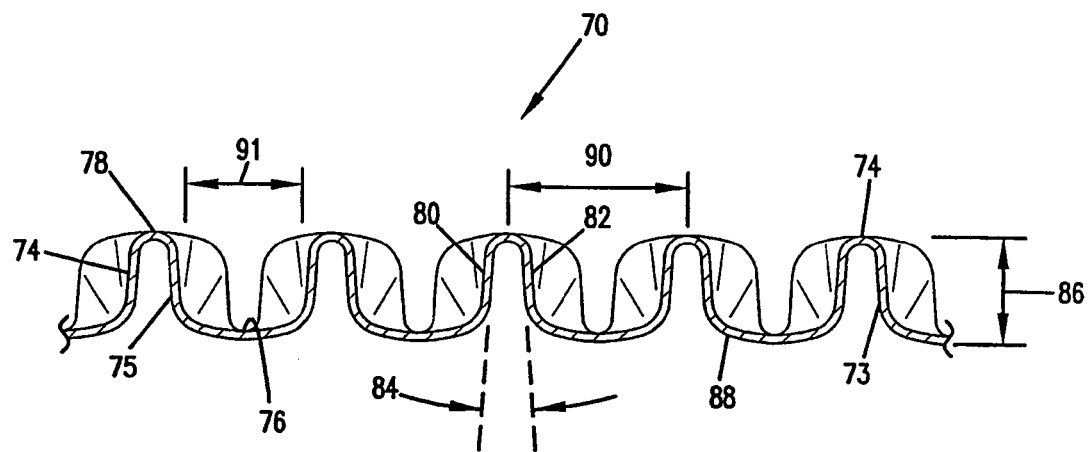
FIG. 4 is a schematic, side elevational view of a portion of an example corrugated web, which may be utilized to form the filter media shown in FIG. 3.

In general, it has been found that one of the factors in selecting flute geometry is based on the principle that it is desirable to have the upstream, open ends as open as can be reasonably engineered, given other system constraints, and the upstream closed ends as small as can be reasonably engineered given other system constraints. Again, to "open the upstream ends," it is meant to increase the cross-sectional area defined at the flute ends, with the cross-sectional area being the area underneath the corrugation that is perpendicular to the direction of fluid flow. In FIG. 4, the corrugations 72 can be seen to include upstream peaks 74 (i.e., peak ends 74) that are wider than the narrow upstream troughs 76 (i.e., trough ends 76) to form flutes 75. Given the assumption that it is desirable to have the area between the upstream troughs 76 and the face sheet 64 be small, the geometry of the upstream troughs 76 can be determined, in many instances, on factors such as media characteristics and corrugation roller properties. If the upstream troughs 76 are too narrow and sharp, then, for some media formulations, the media will tear. Further, the teeth on the corrugation roller used to create the upstream troughs 76 may have a tendency to break if the desired upstream troughs 76 are too narrow. Once the geometry of the upstream troughs 76 is set, then the corrugation density and the angle of the taper can be selected. In general, these factors are useful in determining the resulting shape of the upstream peaks 74.

Figure 5:
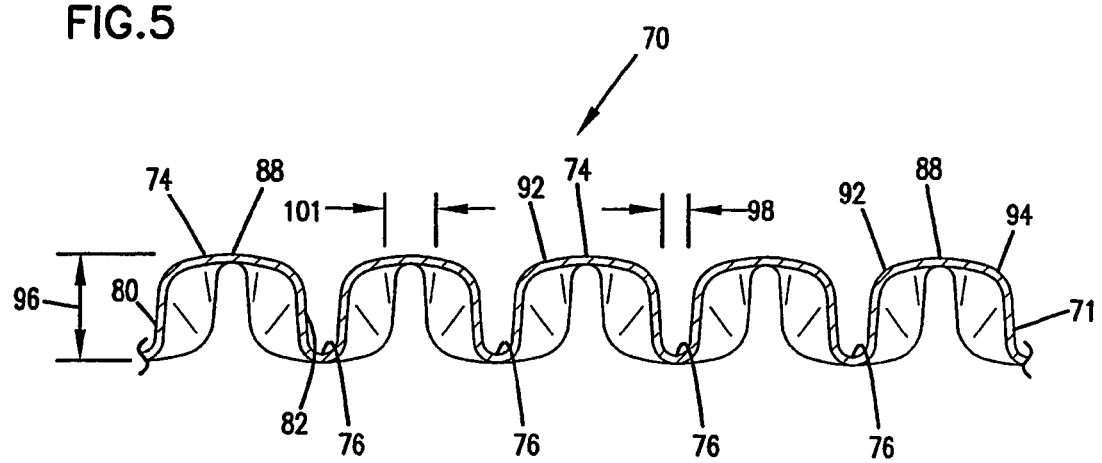
FIG. 5 is a schematic, side elevational view of an opposite end of the corrugated web shown in FIG. 4.

FIG. 5 illustrates the opposite end view of the corrugated web 70 shown in FIG. 4 along what will be assumed to be a downstream edge 73, when the web 70 is configured into a filter element. Thus, for purposes of this description, FIG. 4 shows upstream peak ends 74 and upstream trough ends 76, that, in this particular drawings, are even with the edge 73; FIG. 5 shows downstream peak ends 74 and downstream trough ends 76 that, in the particular embodiment shown in FIG. 5, is even with the edge 71. Extending between each upstream peak 74 and downstream peak 74 is a peak extension 74e (FIG. 6). Similarly, extending between each upstream trough 76 and downstream trough 76 is a trough extension 76e (FIG. 6). By comparing the end views of FIGS. 4 and 5, it can be appreciated that the resulting, desired flute shape for the corrugated web 70 will be symmetrical In actual practice, due to media behavior and other such variables, the actual resulting flute shapes may vary slightly from being completely symmetrical. In FIGS. 4 and 5, the media thickness is viewable and shown by cross-hatching. It should be understood that, in preferred embodiments, the downstream peaks 74 will have the same size and geometry as the upstream troughs 76, and the downstream troughs 76 will have the same size and geometry as the upstream peaks 74.

A number of different flute shapes can be utilized, again, depending upon some of the factors discussed in Section I, above. One example of geometry for the upstream peaks 74 that is useable is shown in FIG. 4 and includes a rounded crest 78 between a pair of side walls 80, 82. As can be seen, the crest 78 of the peak 74 does not come to a sharp point or corner; rather, it is preferably rounded and smooth. Among other things, this helps to prevent the media used in the corrugated web 70 from tearing. A rounded, tapered flute (e.g., a rounded U-shape) is also described in commonly assigned PCT publication WO 97/40918, published Nov. 6, 1997. In the one shown in FIG. 4, an end of the flute shown in FIG. 4, the rounded crest 78 has a radius of at least 0.02 inch and no greater than 0.05 inch, and in many instances, is on a radius of between 0.024 inch and 0.045 inch. In many instances, the radius of the rounded crest is in a range of 0.03-0.04 inch. The side walls 80, 82, in the example shown, are angled relative to each other. This angle 84 defines the taper of each corrugation 72 at one of the end edges of the corrugated web 70. In general, it is desirable to have angle 84 be as small as possible but adjusted for the other factors including media properties and corrugation roller durability. The angle 84 will help to define the area underneath the curve of the downstream peak 74, which is usually desirable to be minimized, again, given the other constraints of media properties and corrugation roller properties. For example in the flutes 75 shown, the angle 84 is not greater than 20°, and is at least 2°. Useable angles 84 for the example flute 75 include 5°-15°, and in particular, about 8°-12°.

Each of the upstream peaks 74 defines a height 86 extending between a point tangent to the rounded crest 78 and aligned parallel to a crest 88 of the adjacent troughs 76. As with the other geometric features of the downstream peak 74, the height 86 will be selected based upon a variety of factors, including media characteristics, corrugation roller characteristics, and filter design factors discussed in Section I. In the particular one shown in FIG. 4, the upstream peak 74 has a height 86 of at least 0.05 inch, not greater than 0.5 inch, typically 0.10-0.25 inch, for example about 0.15-0.20 inch. The distance between adjacent crests 78 of the upstream peaks 74 is shown by reference numeral 90. As with the other geometric definitions of the upstream peak 74, this distance 90 will depend upon the desired filter characteristics discussed in Section I, the media characteristics, and the corrugation roller characteristics. Distance 90 represents the spacing between adjacent upstream peaks 74 at one of the end edges of the corrugation web 70. In the particular one shown, the distance 90 is at least 0.2 inch, no greater than 0.5 inch, typically 0.25-0.4 inch, and for example about 0.32-0.35 inch. Distance 91 is the spacing between the sidewalls 80, 82 at the end 73. The distance between the sidewalls 80, 82 decreases gradually from the end 73 as it proceeds to the end 71. In the example shown, the distance 91 is at least 0.1 inch, no greater than 0.5 inch, typically 0.15-0.3 inch, for example 0.21-0.24 inch.

Turning now to the geometry for the downstream peaks 74, reference is made to FIG. 5. In general, as discussed above, it is desirable that the area underneath the downstream peaks 74 be maximized in order to have the least amount of restriction introduced by the filter element. Each of the downstream peaks 74 includes a rounded crest 88. By "rounded", it refers to the lack of sharp points or corners, and having a defined radius. In the example shown in FIG. 5, the rounded crest 88 is on a radius of at least 0.25 inch, no greater than 0.4 inch, typically 0.275-0.35 inch, and for example about 0.28-0.32 inch. Each of the downstream peaks 74 can also be defined by the side walls 80, 82, which define the upstream peaks 74 at the opposite edge 73 of the corrugated web 70. Each of the side walls 80, 82 extends the length of the corrugated web, with the distance 90 between the side walls 80, 82 increasing between the edge 73 shown in FIG. 4 and the edge 71 shown in FIG. 5. For the edge 71, each of the side walls 80, 82 is joined to the crest 88 of the downstream peaks 74 by an arced region 92, 94. In general, it will be preferable to have this arced region 92, 94 be a smooth transition between the side walls 80, 82 and the crest 88, in order to have a smooth, rounded downstream peak 74. In the particular example shown in FIG. 5, each of the arced regions 92, 94 is on a equal radius, at least 0.05 inch, no greater than 0.15 inch, typically 0.06-0.1 inch, and for example 0.07-0.09 inch. In the example shown, the preferred downstream peaks 74 include a height 96 that is equal to the height 86 of the upstream peaks 74. This is preferred because it results in more convenient manufacturing techniques. In the example illustrated herein, the height 86, 96 is uniform across the length of the flute 62 so that the height 86, 96 is the same for the downstream peak 74, the upstream peak 74, and the peak extension 74e (FIG. 6). The downstream peaks 74 further define a spacing or distance 98 between adjacent downstream peaks 76. In the example shown, this distance 98 is at least 0.01 inch, no greater than 0.1 inch, typically 0.02-0.09 inch, and for example 0.04-0.07 inch. The distance 98 is analogous to distance 91 shown in FIG. 4. Each of the crests 88 of the downstream peaks 74 defines a section 101 between arced regions 92, 94 that is almost flat. The approximate distance of this section 101, in the example shown, is at least 0.05 inch, no greater than 0.25 inch, typically 0.07-0.15 inch, and for example 0.08-0.12 inch.

In the example shown, by comparing FIGS. 4 and 5, it can be seen that the upstream peak 74 (FIG. 4) is smaller in terms of cross-sectional area than the downstream peak 74 (FIG. 5). Indeed, the upstream peak 74 shown (even with the edge 73) defines a cross-sectional area underneath it that is not greater than 75% of the cross-sectional area underneath the downstream peak 74. In the example shown, the area of the upstream peak 74 will be at least 20% of the area of the downstream peak 74, for example, 25-50%.

Because the example corrugated web 70 is symmetrical, it should be understood that the example geometry for the downstream troughs 76 (FIG. 5) is the same as the geometry for the upstream peaks 74 (FIG. 4) described above and incorporated by reference here. Likewise, the example geometry for the upstream troughs 76 (FIG. 4) is the same as the geometry for the downstream peaks 74 (FIG. 5) described above and incorporated by reference here. The troughs 76 may also be described as including a trough depth, which corresponds to the dimensions of the peak heights 86, 96 above. In the example illustrated, the trough depth 86, 96 is uniform at the upstream trough 76, the downstream trough 76, and the trough extension 76e.

FIG. 6 shows a top plan view of the corrugated web 70. Between each of the edges 71, 73, each of the flutes 75, in the example shown, is smooth and rounded. The distance 93 between the side walls 80, 82 of each flute 75 changes between edges 71 and 73 to define the taper of each of the flutes 75. In the example shown, the distance 93 between the sidewalls 80, 82 at the point even with edge 71 is the same as the dimensions given above for distance 98. The distance 93 at the point even with the edge 73 is the same as the dimensions given for the distance 91. The flutes 75, in the example shown, have an angle $\alpha$ of taper of less than 5°, typically less than 3°, at least 0.1°, for example 0.25°-2°, and for example 0.3°-0.8°. The distance 93 at the point even with the edge 73 will be larger than the distance 93 even with the edge 71. The ratio of the distance 93 even with the edge 73 to the distance 93 even with the edge 71 is at least 2:1, not greater than 12:1, typically 3:1-7:1, and for example 5:1.

III. An Example Manufacturing Technique

One way of making the corrugated web 70 includes passing a flat web between a pair of corrugation rollers, each of which has tapering teeth with the taper of the teeth of one of the rollers tapering in a direction opposite to a direction of taper of the teeth of the other of the rollers. In reference now to FIGS. 7-14, a corrugation roller that can be used to make the corrugated web 70 is illustrated. In order to make the corrugation web 70, in this example process, there will be a pair of corrugation rollers 110, 112 used to form the media 114 into the corrugation web 70 shown. See the schematic shown in FIG. 16, which shows the media 114 being pinched and corrugated between the rollers 110, 112. For purposes of explanation, in FIGS. 7-14, only one of the rollers 110 is illustrated in detail. It should be understood that the roller 112 is identical to the roller 110, with the exception of certain grooves 130 that are used in roller 110 but not in roller 112, explained further below. During the corrugation process shown in FIG. 16, the rollers 110, 112 are oriented relative to each other such that the teeth 116 in each roller 110, 112 meshes or mates with corresponding gullets 118 in the opposite roller and the taper direction is opposite to each other.

Figure 8:
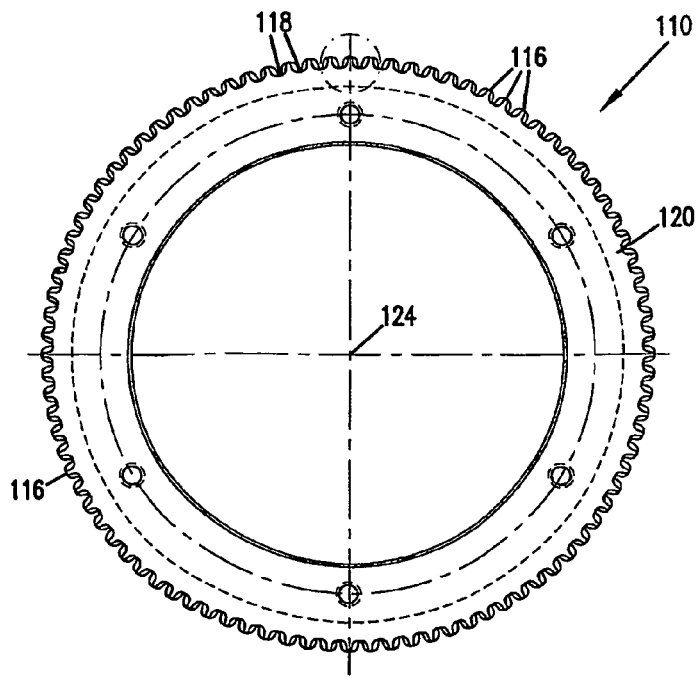
FIG. 8 is an end elevational view of the corrugated roller shown in FIG. 7.

In the example embodiment, the roller 110 is illustrated as a cylindrical roller with opposite ends 120, 122, a geometric center 124, and a longitudinal axis 126 passing through the center 124 (and pointing out of the page in FIG. 8, through the center 124). The roller 110, in the illustrated embodiment, includes a plurality of externally directed teeth 116 projecting radially therefrom. Each tooth 116 has an adjacent gullet 118 next to it. The preferred roller 110 has a uniform distribution of teeth 116, and gullets 118 extending radially thereabout.

The geometry of the teeth 116 and gullets 118 is configured to result in the example corrugations 72 shown in FIGS. 4-6. In FIGS. 7-14, it can be seen that in general, each tooth 116 tapers in width between opposite ends 120, 122 of the corrugation roller 110. The roller 110 or 112 (or both) can be discontinuous along its length; that is, the teeth 116 and gullets 118 do not need to be continuous and uninterrupted from end 120 to end 122 to achieve the desired corrugation 72—there merely needs to be enough tooth 116 and gullet 118 present in intervals to achieve the desired corrugation 72. The media will be continuous across any discontinuities in the roller 110 or 112.

Figure 16:
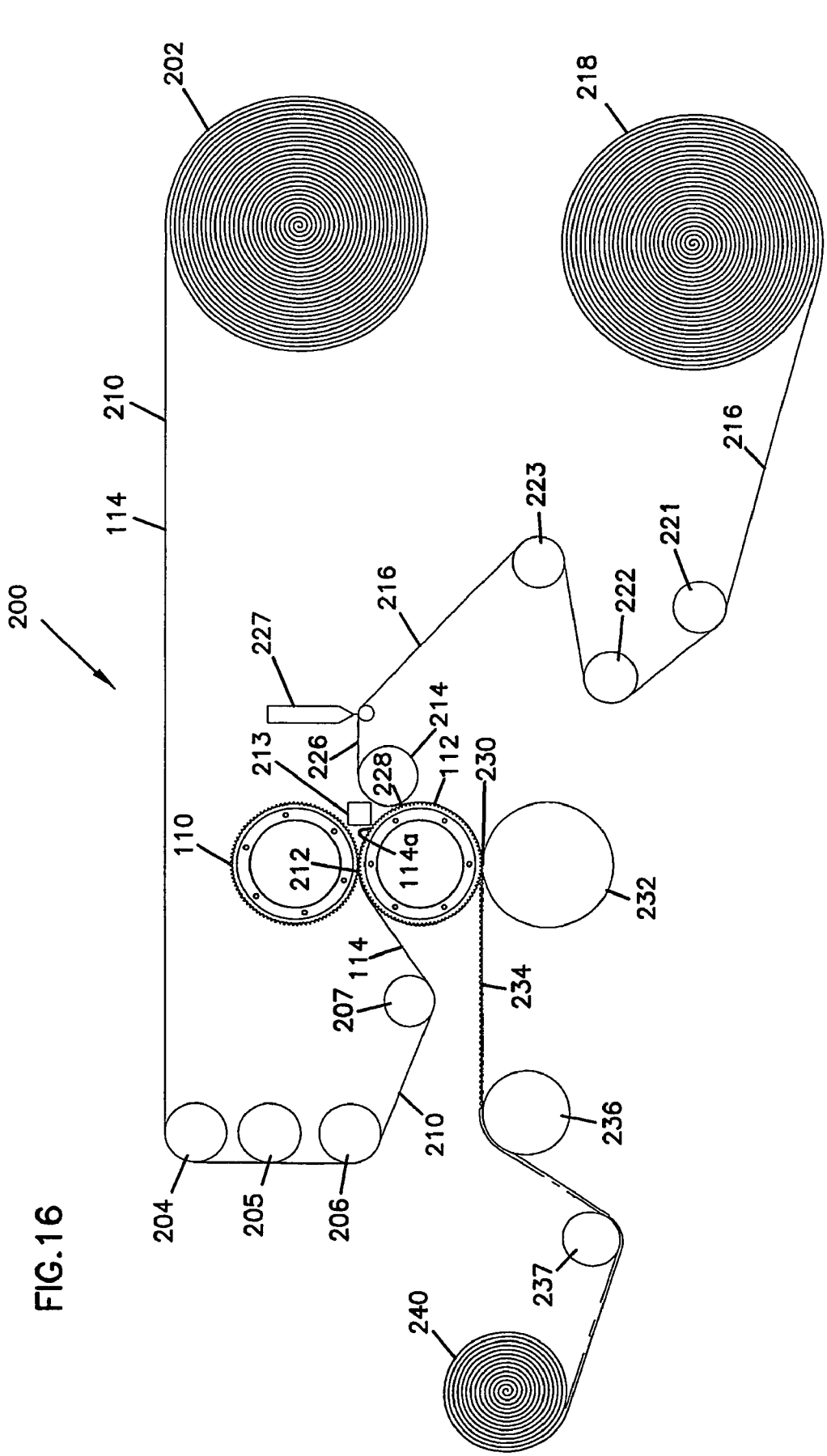
FIG. 16 is a schematic diagram of a process for corrugating a web of material and securing the corrugated web to a flat web of material to create filter media.

One of the pair of preferred corrugation rollers 110, 112 will include web stripping structure 128 to help strip or peel the media 114 away from the roller 110 immediately after being corrugated. In the example shown, the structure 128 includes at least one groove 130 extending transverse to the longitudinal axis 126, also extending transverse to the longitudinal direction of each tooth 116. The groove 130 is an example of a discontinuity in the rollers 110, 112, discussed above. The groove 130 is provided in the roller 110 to allow for engagement with a finger, which intercedes between a media 114 and the roller 110 (FIG. 16). The cooperation between the finger and the groove 130 helps to peel the media 114 away from the roller 110 immediately after corrugation between the rollers 110, 112. Preferably, the groove 130 extends the entire circumference of the roller 110. Useable dimensions for the groove includes a width of at least 0.05 inch, not greater than 0.15 inch, typically 0.07-0.12 inch, and in the one shown 0.09-0.1 inch. The depth of the groove 130, in the one shown, is at least 0.25 inch, not greater than 1.0 inch, typically 0.3-0.7 inch, and in the one shown is 0.45-0.55 inch.

It has been found that it may be useful to have more than one groove 130 on the roller 110 in order to help uniformly strip the roller 110 of the corrugated media 114. At least two grooves 131, 132 can be useful, adjacent to each end 122, 120. It can also be useful to have at least one more groove 130 between the grooves 131, 132. If there are too many grooves, the grooves 130 will interfere with the corrugation process and not result in the desired corrugation web 70. Thus, it is foreseen that no more than 20% of the length of the roller 110 (the length being defined as the distance between end 120 and end 122) will be occupied by space due to grooves 130. In many instances, this percentage will be less than 10%. In the particular embodiment shown, no more than 7% of the distance between ends 120, 122 is occupied by the space of grooves 130. In the particular embodiment shown, there are three grooves 133, 134, 135 between grooves 131 and 132. In preferred arrangements, each of the grooves 131-135 is equally spaced to the adjacent groove by a distance of at least 0.5 inch, no greater than 2.0 inch, typically 1.25-1.75 inch, and in the particular example shown, 1.5 inch. Each of the grooves 131, 132 adjacent to the ends 122, 120 is spaced at least 0.1 inch, no greater than 1 inch, typically 0.25-0.75 inch, and in the one shown about 0.4-0.6 inch. The grooves 130 are not needed in the roller 112 because it is not desired to have the corrugated media 114a stripped from the roller 112. Only the roller (in this case, roller 110) that is positioned above the other roller (in this case, roller 112) needs grooves 130 for media 114a stripping. For roller 112, the teeth 116 and gullets 118 are continuous and uninterrupted along a completed extension of the roller 112.

The corrugation roller 110 illustrated in the drawings is the example corrugation roller that can be utilized to produce the example corrugation web 70. As such, the geometry of the teeth 116 and gullets 118 are similar to the geometry of the peaks 74 and troughs 76. The geometry is not identical, however, in order to accommodate the thickness of the media 114. Each of the teeth 116 includes a narrow end, corresponding to the end 120 and a wide end corresponding to the end 122.

Figure 10:
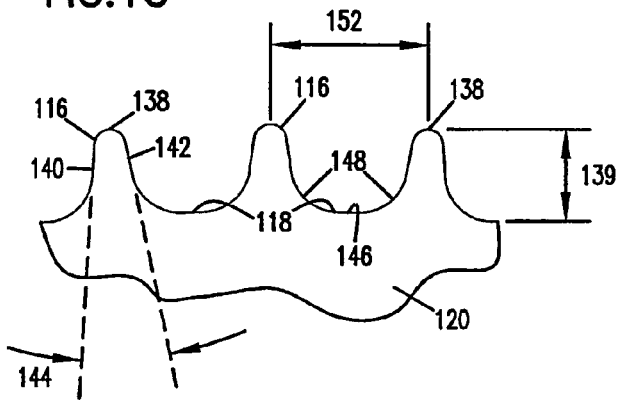
FIG. 10 is an enlarged, schematic view of the end point of teeth used in the corrugated roller of FIGS. 7-9, the end point being the same as the end shown in FIG. 8.

FIG. 10 is an enlarged view of a portion of the end 120, corresponding to the narrow end of the teeth 116. In FIG. 10, the wide end of the teeth 116 has been omitted for purposes of clarity. Each of the teeth 116 at the narrow end shown in FIG. 10 defines a tip 138, preferably rounded. The rounded tip 138 is on a radius of at least 0.01 inch, no greater than 0.07 inch, typically 0.02-0.03 inch, and for example 0.24 inch. Each tooth 116 includes a pair of flanks 140, 142 that are joined by the rounded tip 138. The flanks 140, 142 define an angle 144 therebetween. To produce the corrugated web 70, this angle 144 is at least 10, no greater than 250, typically 50-15°, and for example 9°. The gullets 118 between each of the teeth 116 defines a root 146, which accommodates or receives a tooth 116 from the opposite corrugation roller 110, 112 with the media 114 being formed into the desired corrugated web 70 by being between a tooth 116 in one roller 110 (or 112) and a mating root 146 in the other roller (112 or 110). There is a smooth transition between each of the flanks 140, 142 and each of the roots 146 defined as a fillet radius 148. The fillet radius 148 for the particular example corrugation roller 110 shown is at least 0.05 inch, no greater than one inch, typically 0.075-0.09 inch, and for example 0.084 inch. Each tooth 116 includes a height 139 between a line tangent to the tip 138 and a line tangent to the root 146 of at least 0.05 inch, no greater than 0.25 inch, typically 0.1-0.2 inch, and for example 0.183 inch. The teeth 116 have a pitch 152, defined as the distance between each adjacent tooth 116 of at least 0.15 inch, no greater than 0.6 inch, typically 0.25-0.5 inch, and for example 0.3-0.4 inch.

Figure 11:
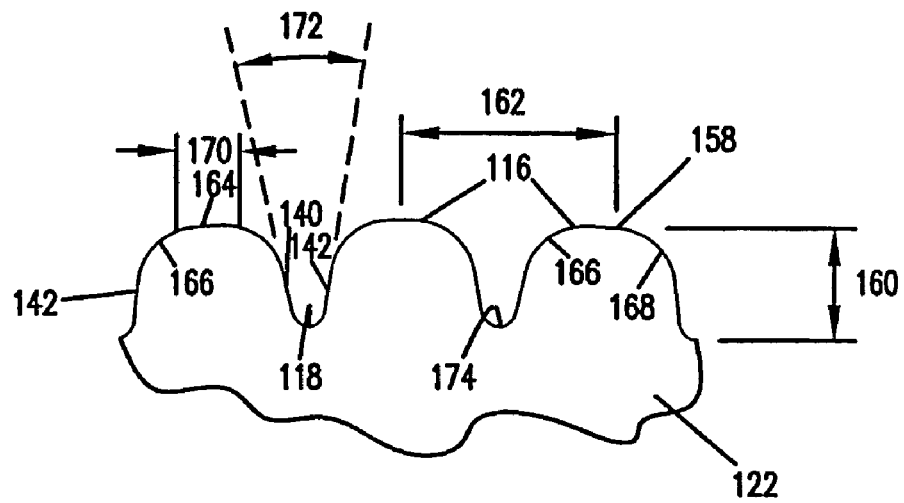
FIG. 11 is an enlarged view of some of the teeth on the corrugation rollers of FIGS. 7-9, the end being the end view shown in FIG. 9.
Figure 9:
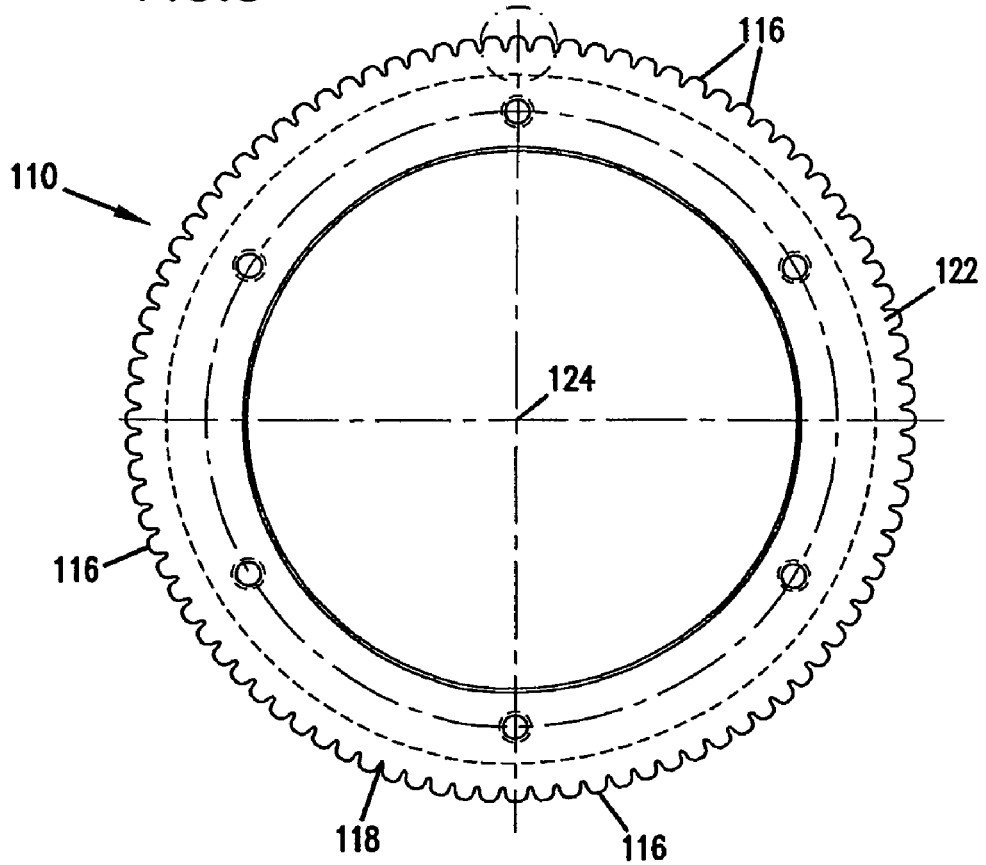
FIG. 9 is an end elevational view of the corrugated roller shown in FIG. 7, the end being the opposite end as that shown in FIG. 8.

In reference now to FIG. 11, the wide end of the teeth 116 is shown. Again, the wide end corresponds to the end 122 of the corrugation roller 110. Again, the geometry of the wide end of the tooth 116 is selected in order to result in a desired corrugation web, in this example, the corrugation web 70 described earlier. Example geometry is provided below.

In FIG. 11, each tooth 116 includes a tip 158, side flanks 140, 142, a height 160, and a pitch 162. The tip 158 has a section 164 that is joined to each of the flanks 140, 142 by a respective intermediate fillet 166, 168. The section 164 is almost flat or planar, but is on a slight radius of at least 0.1 inch, no greater than 0.5 inch, typically 0.2-0.4 inch, and for example 0.29-0.31 inch. The section 164 has a length 170 of about 0.04 inch, no greater than about 0.25 inch, typically 0.07-0.15 inch, and for example 0.08-0.12 inch. Each of the fillets 166, 168 is on a radius of at least 0.05 inch, no greater than one inch, typically 0.07-0.08 inch, and for example 0.074 inch. The height 160 is preferably the same as the height 150, in order to promote more convenient manufacturing techniques. The pitch 162 is least 0.15 inch, no greater than 0.6 inch, typically 0.25-0.5 inch, and for example 0.3-04 inch. There is an angle 172 defined between adjacent flanks 140, 142 that form the gullet 118. This angle 172, for the particular corrugation roller 110 illustrated, is least 2°, no greater than 20°, typically 5°-15°, and for example 10°. The root 174 for the wide end of the teeth 116, as shown in FIG. 11, is on a radius of at least 0.01 inch, no greater than about 0.08 inch, typically 0.03-0.06 inch, and for example 0.045 inch.

The particular preferred corrugation roller 110 shown has an overall size that is selected based upon the desired manufacturing process. For the one shown, the diameter of the corrugation roller 110 is at least 5 inches, no greater than 20 inches, typically 7-15 inches, and in the one shown 9-10 inches. Also, for the particular corrugation roller 110, shown, the number of teeth 116 is at least 80, no greater than 115, typically 85-95, and in the one shown 92. The number of gullets 118 equals the number of teeth 116, in preferred embodiments. The overall length of the roller 110 will depend, at least in part, upon the desired length of the resulting flutes 75 in the corrugate web 70. In the example shown in the drawings, the length of the corrugation roller 110 is defined between end 120 and end 122. The length is at least 4 inches, no greater than 10 inches, typically 5-8 inches, and in the one shown is 7-7.1 inches. The rollers 110, 112 can be made from durable, strong, reliable materials, such as a hard stainless steel with a hardness of, for example, at least 42 Rockwell c.

Figure 12:
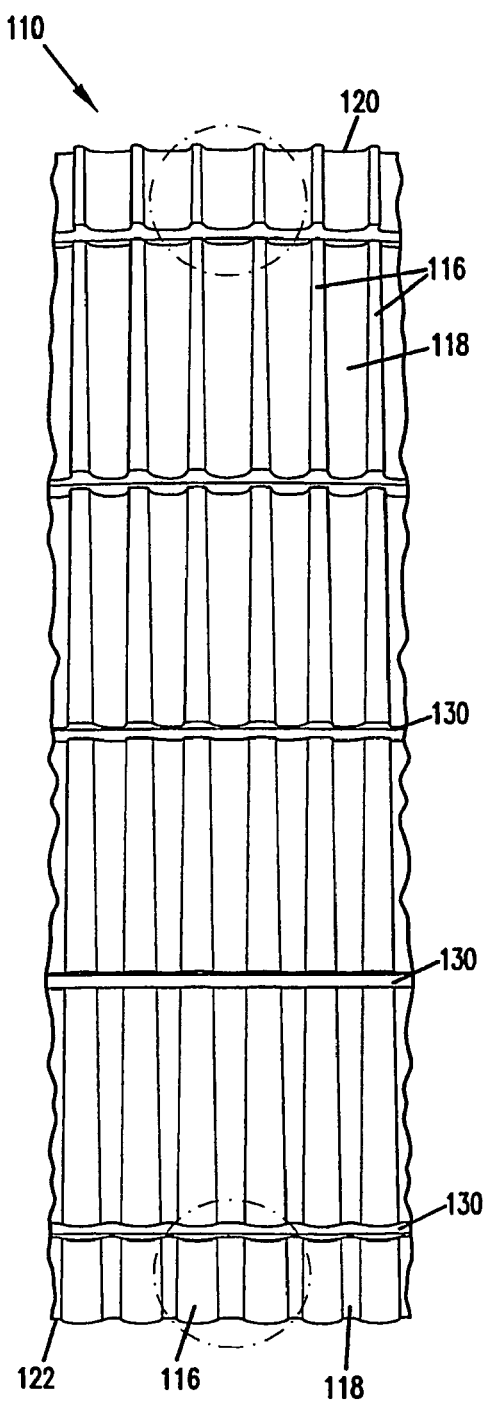
FIG. 12 is an enlarged view of one section of the corrugated roller of FIG. 7.
Figure 13:
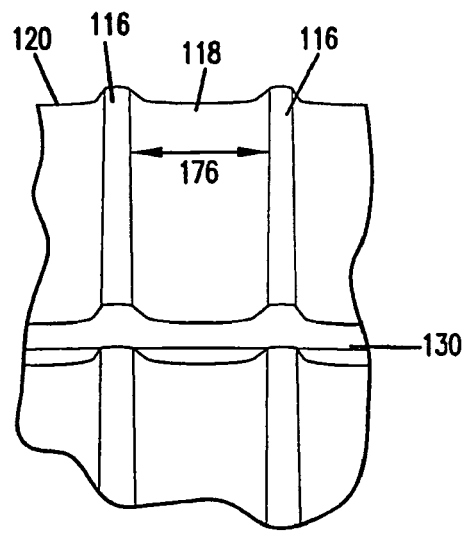
FIG. 13 is an enlarged view of one section of the corrugated roller shown in FIG. 12.
Figure 14:
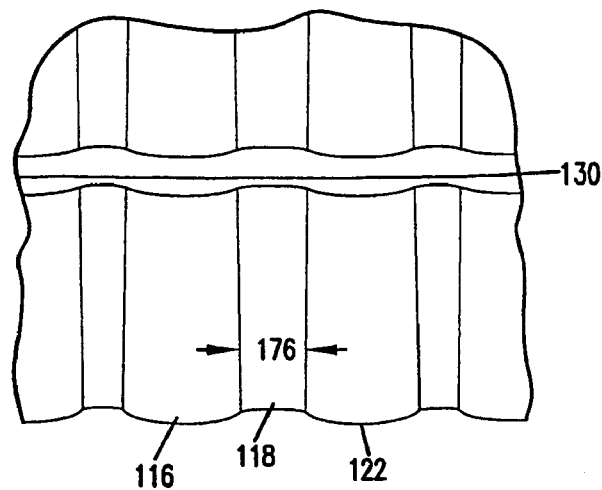
FIG. 14 is an enlarged section of another portion of the corrugated roller shown in FIG. 12.

Reference is now made to FIGS. 12-14. An enlarged, fragmented view of the corrugation roller 110 is shown in FIG. 12 between end 120 and end 122. The taper of each of the teeth 116 and the intermediate gullets 118 can be seen in FIG. 12. Each tooth 116 increases in width, gradually, as the tooth 116 proceeds from the end 120 to the end 122. Likewise, the intermediate gullets 118 decrease in dimension or width as each extends from the end 120 to the end 122. In reference to FIG. 13, the distance between adjacent teeth 116 is shown by dimension 176. Dimension 176 can also been seen in FIG. 14. By comparing FIG. 13 and FIG. 14, it can be seen that the distance 176 between adjacent teeth 116 at end 120 is greater than the distance 176 between adjacent teeth 116 at the end 122. In the specific example shown, the teeth 116 are shown to be on a taper of less than 2°, at least 0.1°, typically 0.25°-1°, for example about 0.6°-0.8°. The distance 176 that is even with the end 120 is shown to be at least twice the distance 176 that is even with edge 122, typically 3-6 times the distance, for example 5 times the distance. In the illustrated example, the distance 176 that is even with the edge 120 is at least 0.08 inch, no greater than 0.6 inch, typically 0.1-0.4 inch, for example 0.2-0.3 inch. The distance 176 that is even with the end 122 is at least 0.008 inch, no greater than 0.12 inch, typically 0.15-0.1 inch, and for example 0.03-0.08 inch.

From a review of FIGS. 7-14, it can be appreciated that each of the teeth 116 and gullets 118 defines a smooth, contour to result in a desired tapered flute 62 in the corrugated web 50. It has been found that by utilizing certain manufacturing techniques to make the corrugation roller 110, the resulting teeth 116 and gullets 118 give a smooth contour extending between the ends 120 and 122 of the roller 110. One preferred manufacturing technique for making the example corrugation roller 110 utilizes a wire electric discharge machine, schematically shown at 180 in FIG. 15 and utilizes techniques as described below.

Figure 15:
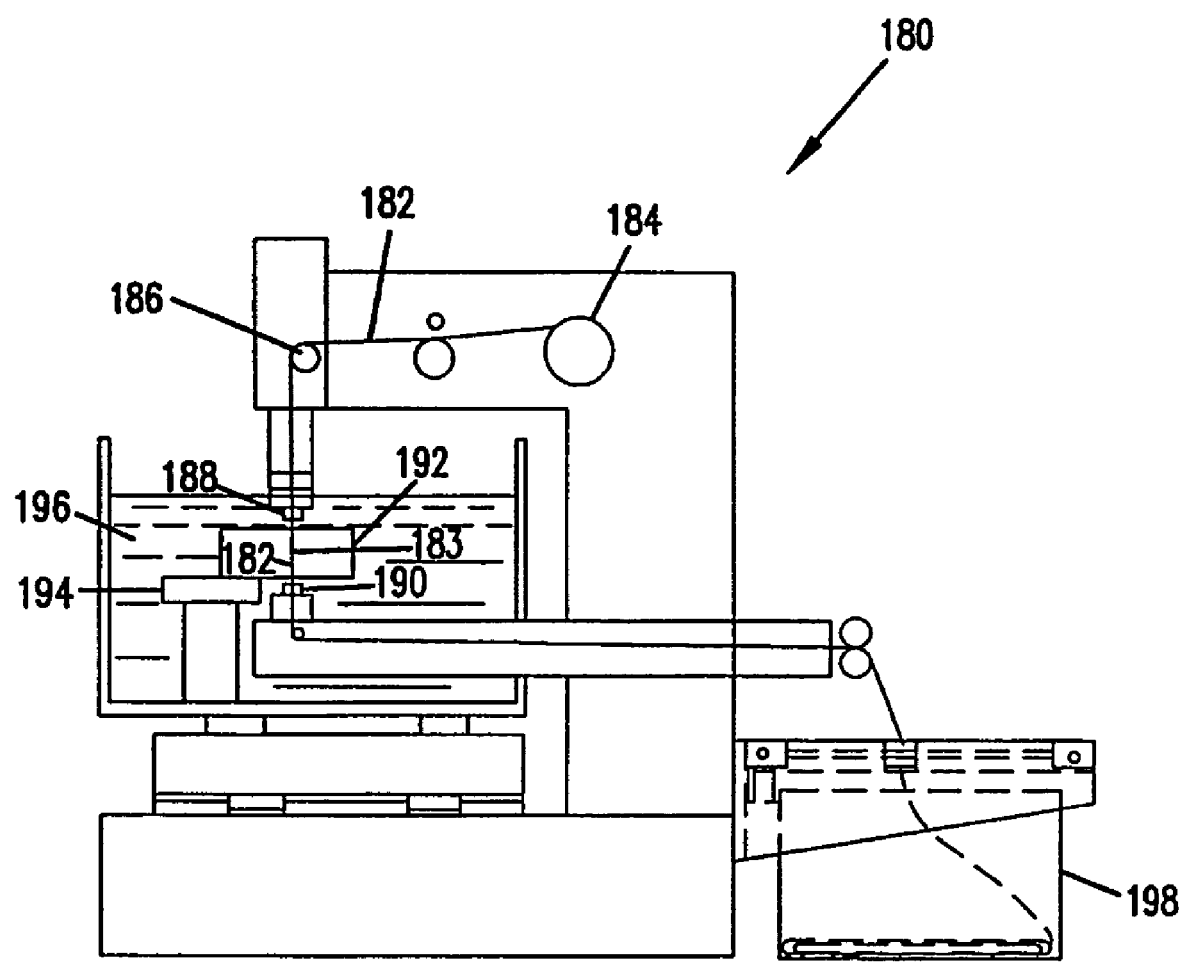
FIG. 15 is a schematic side elevational view of a wire electric discharge machine that can be used to manufacture the corrugation roller of FIGS. 7-14.

In reference to FIG. 15, an example of a useable wire electric discharge machine (EDM) is shown schematically. In general, electric discharge machining is a method for producing shapes by using an electric discharge (spark) to remove unwanted material. The basic idea is move an electrode very close to the workpiece and repeatedly produce a spark between the two. This is usually done while immersed in a dielectric liquid, rather than an air. A wire EDM machine, as shown at 180, uses a wire as the electrode which passes between guides like a bandsaw blade. As the wire runs from a spool through the job, it is eroded and reduced in diameter. In the example EDM 180 shown in FIG. 15, a wire electrode 182 can be seen stranded around a wire bobbin 184. An upper guide roller 186 helps to change the direction of the wire electrode 182. Further, there is another upper wire guide 188 and a lower wire guide 190 to also help guide the direction of the wire electrode 182. A workpiece assembly or construction 192 can be seen mounted on a table 194. The table is usually controllable in an X and Y axis. The workpiece 192 is shown immersed within a machining dielectric bath 196. In general operation of the EDM 180, the wire electrode 182 is fed from the wire bobbin 184 under the control of a computer, or some other numerical control unit. The wire electrode 182 is fed to the upper guide 188 and then to the workpiece 192 forming a machining gap to execute electric discharge machining by a pulse voltage sent from a power supply along a cutting line 183 created by the gap between the wire electrode 182 and the workpiece 192. The used portion of the wire electrode 182 passes through the lower guide 190 and is collected in a collecting case 198. To machine the workpiece 192 with the desired profile, both the wire electrode 182 as well as the workpiece 192 is moveable.

To make the desired corrugation roller 110, the geometric definition of the end face of the teeth 116 and gullets 118 at each end 120, 122 is provided. In order to result in a smooth tooth and gullet surface between each of the ends 120, 122, the wire electrode 182 is kept at a uniform distance at each end of the wire electrode 182 from the longitudinal axis passing through the center of the workpiece 192. By "each end of the wire electrode 182", it is meant the portions of the wire electrode 182 that engage the workpiece forming the end face of the teeth 116 and gullets 118 at each end 120, 122. See FIG. 18. In other words, to make the roller 110, a workpiece 192 is utilized defining a central longitudinal axis 300, which corresponds to the resulting longitudinal axis 126, FIG. 7. Preferably, the workpiece 192 is shaped in a cylinder. During the machining process, the end 302 of the wire electrode 182 forming end face 120 will always be the same radial distance to the central longitudinal axis of the workpiece 192 as the opposite end 304 of the wire electrode 182 forming end face 122. The radial distance will change as each tooth and gullet is machined, but the radial distance 306, 308 of each end of the wire electrode 182 to the central longitudinal axis of the workpiece 192 will be uniform and the same. Because the profile of the teeth at end 120 is different from the profile of the teeth 116 at end 122, in order to have the uniform radial distance at each end of the electrode 182 to the central longitudinal axis maintained, the tool speed has to be varied along the length of the wire electrode 182. Thus, each of the teeth 116 of the corrugation rollers 110, 112 is the result of maintaining end points of a cutting line an equal radial distance to a central axis of a workpiece 192 used to generate the corrugation rollers 110, 112. Put another way, each of the teeth 116 of the corrugation rollers 110, 112 is formed by an "end point tooth cutting definition." The term "end point tooth cutting definition" means, herein: the end 302 of the wire electrode 182 forming end face 120 is maintained as the same radial distance to the central longitudinal axis of the workpiece 192 as the opposite end 304 of the wire electrode 182 forming end face 122 radial distance to the central longitudinal axis; i.e., maintaining end points of a cutting line an equal radial distance to a central axis of a workpiece 192.

Figure 19:
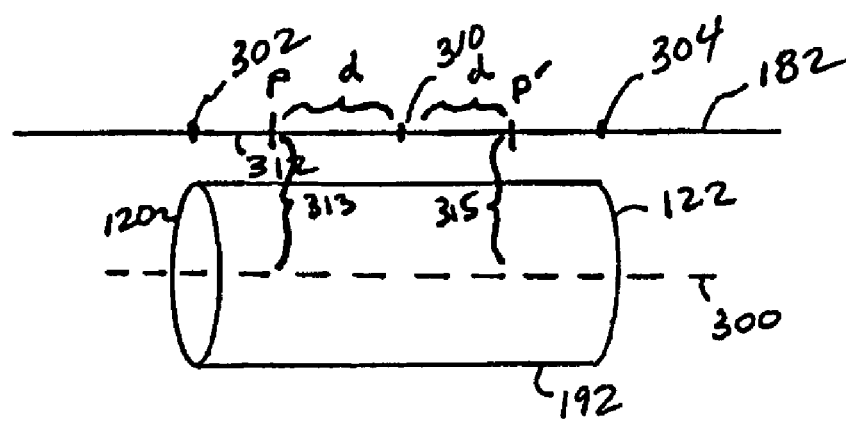

See FIG. 19. Another way to view this forming approach is with respect to the wire electrode 182 as follows: (1) the wire electrode 182 has first and second ends 302, 304 that correspond to the end faces 120, 122 of the teeth 116 and gullets 118; (2) the wire electrode 182 has a midpoint 310 between the two ends; (3) at any given point p on the wire electrode 182 spaced a given distance d from the midpoint 310 in the direction of the end 120, there is another point p' on the wire electrode 182 spaced the same given distance d from the midpoint in the direction of the end 122; and (4) when the wire electrode 182 is forming the teeth 116 (or gullets 118), the wire electrode 182 at each of these points p and p' is at the same distance 313, 315 as each other to the longitudinal axis passing through the center of the workpiece 192. Thus, there is symmetry along the cutting line 312 defined by the wire electrode 182. For any given point spaced a first distance from the midpoint of the wire electrode 182 toward the first end 120, there is corresponding point spaced the first distance from the midpoint of the wire electrode 182 toward the second end 122, and these corresponding points will be spaced the same distance to the longitudinal axis passing through the center of the workpiece 192 to form the teeth 116 and gullets 118 and generate the corrugation rollers 110, 112. Stated another way, each of the teeth 116 of the corrugation rollers 110, 112 is formed by an "cutting line midpoint definition." The term "cutting line midpoint definition" means, herein: maintaining a cutting line an equal radial distance to a central axis of a workpiece arrangement used to generate the corrugation roller for (i) any given point on the cutting line spaced a first distance from a midpoint of the cutting line in a direction toward a first end of the roller as (ii) a point along the cutting line spaced that first distance from the midpoint of the cutting line in the direction toward second, opposite end of the roller.

Figure 20:
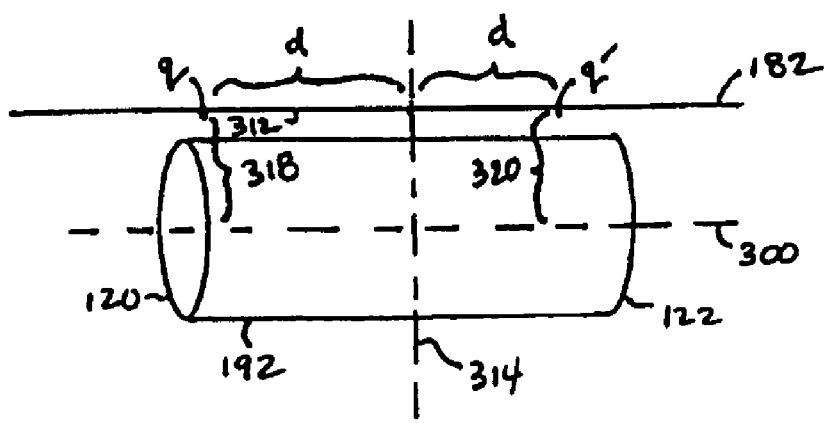

See FIG. 20. An alternate way of viewing this is by reference to, rather than the midpoint of the wire electrode 182, the midpoint of the teeth 116 (or gullets 118). By "midpoint of the teeth 116", it is meant the midpoint between end face 120 and end face 122. The midpoint of the teeth 116 (or gullets 118) defines a plane 314 passing through the workpiece 192, and orthogonal to the longitudinal axis 300 of the workpiece 192. At any given point q on the wire electrode 182 spaced a given distance from this plane in the direction of the end 120, there is another point q' on the wire electrode 182 spaced the same given distance d from the plane in the direction of the end 122. The wire electrode 182 at each of these points q, q' is at the same distance 318, 320 as each other to the longitudinal axis passing through the center of the workpiece 192. Thus, there is symmetry about the plane 314 passing through the midpoint of the teeth 116 along the cutting line 312 defined by the wire electrode 182. For any given point along the wire electrode 182 spaced a first distance from the plane toward the first end 120, there is corresponding point along the wire electrode 182 spaced the first distance from the plane toward the second end 122, and these corresponding points will be spaced the same distance to the longitudinal axis passing through the center of the workpiece 192 to form the teeth 116 and generate the corrugation rollers 110, 112. Stated another way, each of the teeth 116 of the corrugation rollers 110, 112 is formed by a "teeth midpoint definition." The term "teeth midpoint definition" means, herein: maintaining a cutting line an equal radial distance to a central axis of a workpiece arrangement used to generate the corrugation roller for (i) any given point on the cutting line spaced a first distance from a plane passing through a midpoint of the teeth in a direction toward a first end of the roller as (ii) a point along the cutting line spaced that first distance from the plane passing through a midpoint of the teeth in the direction toward second, opposite end of the roller.

Figure 18:
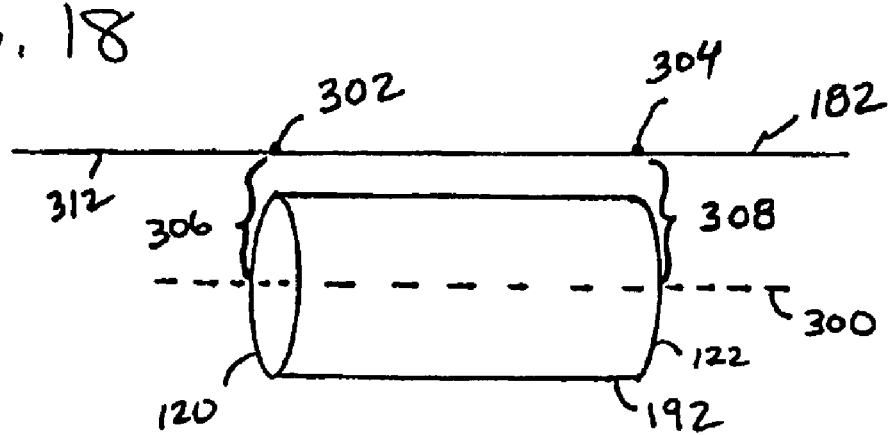
FIG. 18-FIG. 20 are schematic diagrams illustrating ways of generating teeth for the corrugation rollers of FIGS. 7-14.

In each of FIGS. 18-20, it should be understood that the cutting line 32 can pivot in a direction into and out of the paper, but it remains unskewed relative to the longitudinal axis 300. By "unskewed," it is meant that one end 302 of the cutting line cannot be spaced closer to the longitudinal axis 300 than the opposite end 304 of the cutting line 312.

It should be understood that due to machine variables, etc., for each of the descriptions corresponding to FIGS. 18-20 above, when described that "the radial distance to the longitudinal axis 300 of the workpiece 192 from a given point is equal to the radial distance to the axis 300 from another point" and variants of that description, it does not have to be precisely equal but should be roughly equal, given tolerances, machining variances, etc. In previous systems, the cutting speed along the length of the wire electrode 182 was kept constant. In such systems, due to the different cross-sectional configuration of the wide end of the tooth 116 from the narrow end of the tooth 116, the wire electrode 182 would be at a different radial distance from the center of the workpiece, when comparing any given point on the wire electrode 182 spaced a first distance from the midpoint of the wire 182 in the direction of one end, to the point along the wire electrode 182 spaced that first distance from the midpoint of the wire 182 in the direction of the other end. As described herein, the preferred corrugation roller 110 is not formed by maintaining constant wire speed, but rather, by controlling radial distances for corresponding points about a plane of symmetry passing through the midpoint of the wire electrode 182 and the midpoint of the teeth 116. At any point during the cutting process, any given point on the wire electrode 182 spaced a first distance from the midpoint of the wire 182 in the direction of one end can be compared to the point along the wire electrode 182 spaced that first distance from the midpoint of the wire 182 in the direction of the other end; and each of these given points will be the same distance from the central axis of the workpiece 192. As the tooth 116 is cut, this distance will change, but it will change the same.

IV. An Example Method for Producing a Corrugated Web and Corrugated Filter Media In reference now to FIG. 16, an example, schematic process for forming the corrugated web 70 and resulting filter media 66 is shown in general at 200. In general, flat filter media 114 is unwound from a roll 202 and led around various tension rollers and/or guide rollers 204, 205, 206, 207. The composition of the media 114 will be selected based on desired filter characteristics, corrugation properties and other factors, described more fully in Section V below. In many instances, it will be desirable to have the media composition include some "give" to permit it to stretch in the machine direction, in order to withstand the corrugation process. For filtering characteristics, it may be desirable to use a media with a layer of fine fibers applied thereto.

After winding around various tension rollers 204-207, the web 210 of the filter media 114 is then fed through the nip or bite 212 between mating corrugation rollers 110, 112. In some preferred processes 200, just before the web 210 is fed into the nip or bite 212 between the corrugation rollers 110, 112, the media 114 is heated to a temperature sufficient to soften resin in the media 114 and help the media 114 to better retain its corrugated shape. This temperature the media 114 is heated to will depend upon the particular media 114 selected, and the desired properties of the media 114. In one example process for a particular type of media 114, the web 210 is heated to a temperature of at least 120°, no greater than 250°, and preferably 170°-190°. The web 210 is formed into its desired corrugation shape by being mechanically deformed by being pressed between a mating tooth 116 and gullet 118 between the roller 110 and the roller 112. After passing through the bite 212, the corrugation roller 110 is stripped of the corrugated media 114a by fingers (not shown) engaging the grooves 130 (FIG. 7) to peel the corrugated media 114a from the roller 110. The fingers project from a bar 213 oriented adjacent to the roller 110. After passing through the bite 212 and being stripped from the roller 110, the corrugated media 114a has a bead of sealant material applied from an applicator secured to the bar 213. The sealant is applied adjacent to an edge of the corrugated media 114a Useable sealant materials are described in Section V below.

Next, the corrugated web 114a is directed to follow along the corrugation roller 112. At this point, the corrugated web 114a is then introduced to a flat web 216 (the flat web 216 ultimately resulting in the face sheet 64 (FIG. 3)). The flat web 216 is unwound from a roll 218 and fed around a number of tension rollers 221, 222, 223. Just prior to being introduced to the corrugated media 114a, material 226 is applied by an applicator 227 adjacent to the edge surface of the flat web 216 and at various intervals between the edges in order to secure the corrugated media 114a to the flat web 216. The applicator 227 applies at least one, and preferably 2-6 tack adhesive lines to the flat web 216 in order to tack the corrugated media 114a to the flat web 216. The tack adhesive does not create fluid impermeable seals; rather, it merely provides some attachment or security of the corrugated media 114a to the flat web 216. Adjacent to the edge where the sealant bead will result between the corrugated media 114a and the flat web 216, a bead of sealant is applied, to insure that when the flat web 216 is secured to the corrugated media 114a, the flutes that are intended to be closed by the sealant bead are closed completely, without pin holes. As will be described below, the useable materials for the adhesives for applying the tack securement may differ from the adhesives used for applying the main sealant bead, discussed in Section V below.

In FIG. 16, from review of the corrugation rollers 110, 112, it can be seen that the media 114a that the exits the bite 212 has the general configuration of the corrugated web 70, shown in FIG. 5, at the edge that is viewable in FIG. 16. The flat web 216 is applied to the top surface of the corrugated web 114a, which would correspond to the top surface of the corrugated web 70 shown in FIG. 5. When the sealant material is applied along the edge of the corrugated media 114a, it will be applied along the edge viewable in FIG. 16. Preferably, the sealant material applied in the particular process illustrated in FIG. 16 will be the downstream sealant 55d (FIG. 3) to form the downstream seal 59 (FIG. 3). The application of the seal in this region fills the space between the narrow, downstream troughs 76 and the flat web 216. By making the seal be the downstream seal 59, it ensures that, if fine fiber is on the web 210 and web 216, the layer of fine fiber on the corrugated web 114a as well as the layer of fine fiber on the flat web 216 is on the upstream side.

The flat web 216 and the corrugated media 114a are joined together at the bite 228 between the roller 214 and the corrugation roller 112, where it continues to roll along the corrugation roller 112 and then through a nip 230. The nip 230 provides even further pressure between the corrugated media 114 and the flat web 216 to help press and secure the two webs together. The nip 230 is created between the corrugation roller 112 and a pressure roller 232.

After passing through the nip 230, the resulting filter media 234 is fed therefrom. The filter media 234 comprises the corrugated media 114a secured to the flat web 216 by adhesive material. The filter media 234 is fed along more tension rollers 236, 237 before being wound into a storage spool 240. The spool of filter media 234 can be used for filter making processes, an example one of which is described below.

In some applications, after the filter media 234 is formed, and before it is wound into the spool 240, it may be cut in half to result in two spools of filter media. This may be done if the corrugation rollers 110, 112 are adjusted to include what would be two complete lengths of the desired corrugation pattern. When forming two spools 240 of filter media 234, the sealant material will be applied down the center, such that the completed media 234 can be cut down the center along the seal created between the flat web 216 and corrugated media 114a to form the two sections of media 234.

The web 210 as well as the web 216 may include, as mentioned above, a layer of fine fiber if certain filtering characteristics are desired. If using fine fiber, the corrugated media 114a is secured to the web 216 such that the layers of fine fiber would form the "dirty side" of the filter. In the example shown in FIG. 16, if fine fiber is being used on the web 210 and on the web 216, the fine fiber would be on the side of the media facing the machinery, while the fine fiber on the web 216 would also be on the inside, facing the machinery. This way, when the media 114a is secured to the web 216, the sides with the fine fiber are together and facing each other.

After forming the spool 240 of filter media 234, the end of the filter media 234 is cut along a peak 74, which can be done with the help of a servo-control shear. A seal is formed along this edge, by applying the material 226, such as hot melt or other adhesive into this edge to create a lead end seal. This lead end seal will be the leading end of the filter media 234 that is used to be wound into the resulting filter element.

Figure 17:
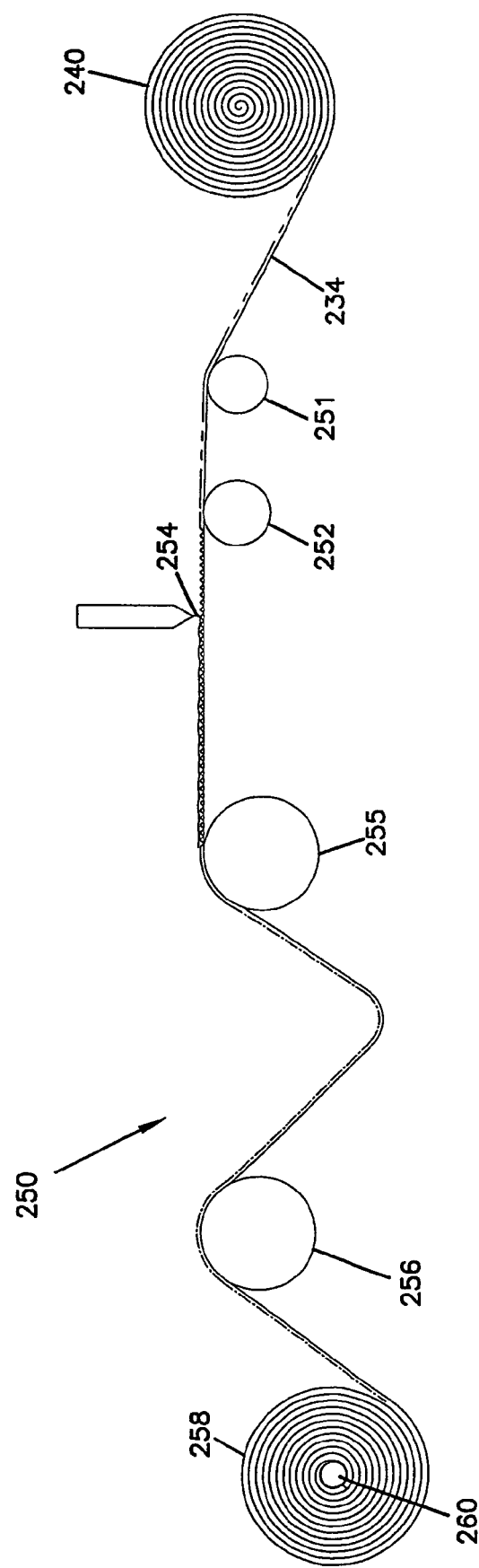
FIG. 17 is a schematic diagram of a process for forming the filter media created in FIG. 16 into a filter element.

FIG. 17 illustrates, schematically, a filter making process generally at 250. In the example process 250 shown, the filter media 234 is being formed into a round filter element, such as the filter element 20 (FIG. 1). In FIG. 17, the filter media 234 is unwound from the spool 240 and passed around some tension rollers 251, 252. Sealant material 254 is applied to the corrugated portion of the filter media 234 along an edge opposite to the edge where the sealant material was applied during the process 200. In the example described, the sealant material 254 is applied to create the upstream seal 57 (FIG. 3). Again, the material 254 can be hot melt or other appropriate adhesives. After applying the material 254, the filter media 234 passes along more rollers 255, 256 before being wound into a coiled configuration 258 of a desired cross-sectional shape. In the process 250 shown, the coil 258 is circular. Also, in the process 250 shown, the filter media 234 is initially secured to and wound around a central core 260. When the coil 258 reaches the desired size (in this case, diameter), the filter media 234 is cut off and tightly secured to the outer periphery of the coil 258. It may be desirable to forming a trail end seal by cutting the outermost end of the filter media 234 along a peak 74 and forming a seal along this edge, by applying adhesive material 226, such as hot melt or other adhesive into this edge. At that point, desired sealing gaskets or other features may be added to the coil 258 to result in the desired filter element.

V. Some Useful Materials

A variety of materials can be utilized as the media. In general, the media material would be chosen based upon the user's preferences with respect to factors as: media cost and availability; fluid type and environment of filtering (for example air versus liquid; caustic or non-caustic environment); and, efficiency desired with respect to filtration.

As indicated above, in general it will preferred to utilize media, for corrugation processes according to the present disclosure, which has enough ability to "stretch" or "give" in the machine direction (MD), to accommodate not only the different shapes of the corrugations at opposite ends of the flutes, but also in between the opposite edges of the media. More specifically for the media to readily conform to the preferred corrugation shape characterized, preferably the media is one that:
  (a) can easily stretch different amounts (across its width) in the machine direction (MD) during corrugation; and
  (b) will retain the corrugated shape.

Herein, a particular, preferred, corrugation size and shape was indicated. In general, it has been found that a media having a nominal or average machine direction (MD) elongation of 4.5% or higher will typically be preferred for such a corrugation. (Herein, references to a nominal or average machine direction elongation of 4.5% or greater, are meant to measurement with a tensile tester with a cross head speed of two inches per minute and a span of four inches.) Typically, it will be preferred that the media used will be one which has a machine direction elongation of at least 3.5%, typically, at least 4.0%. Preferably, elongation will be between 4% and 7.5% and average about 5%.

In some instances, it may be found that 100% cellulose media does not possess adequate characteristics of elongation in a machine direction, to be wholly desirable in corrugations of the type characterized herein. The reason for this is that although 100% cellulose fiber materials readily corrugate and retain corrugated shapes, such materials may be stressed, in some instances to the point of failure, by a corrugation process which involves corrugating to certain tapered definitions.

In some instances, it may be desirable to utilize a 100% synthetic fiber media, wherein the fibers are formed from polymers, such as: rayon(s), polyamide(s), polyvinyl chloride(s), polyvinyl acetate(s), polyvinyl alcohol(s); polyvinyl ethylene(s); polypropylene(s); polyester(s), mixtures of these polymers, etc. Of course, fiber blends or mixtures could be used. In general, what is desired is a synthetic material which provides the media with adequate strength and elongation properties (in the machine direction), as well as adequate strength and integrity for use in media in the filtration environment involved. By "synthetic", all that is meant is that the fibers are non-cellulose.

Herein, rayon(s) are considered synthetic fiber media. Although based on cellulose, herein they are considered synthetic since they result from regeneration of cellulose. Thus, when defining media composition:

(a) the term "cellulose" excludes rayon(s); and, (b) the terms "non-cellulose" and "synthetic" include rayon(s).

It is noted that in some instances a media comprising a mix of cellulose fibers and synthetic fibers can be used and may be preferred. Preferred such materials would be ones having a synthetic fiber content within the range of no greater than 80%, at least 30%, typically 35-75%, and preferably about 45% to 60% by weight, based on total weight of fiber. The remainder of fiber weight would preferably be cellulose fiber material.

The particular media choices, again, will in part be a matter of choice based on factors not related to the corrugation. In many instances, it is believed it will be desirable to have a media to which resin has been applied to facilitate retention of the synthetic fibers in the corrugated shape. A typical resin would be one that provides adequate stiffness to hold the corrugated shape under the media handling conditions, yet which can be softened adequately before and during corrugation to allow the media to conform to the corrugations. The resin formulation can be obtained from commercial resin suppliers such as Air Products and Chemicals, BASF, Bayer Chemical, Borden, Dow Chemical, HB Fuller, National Starch, Noveon Specialty Chemicals, Parachem, Reichhold, and Rohm & Haas. The resins will include solutions or emulsion polymers with Tg in the range of −20 C to 50 C or a blend of such polymers. It is believed that the resin content of the media would be at least 8% and typically be between about 15% to 24% (inclusive), by total weight of the corrugated media. Preferred resin formulations would be ones in which the resin formulation has 5% to 30% by weight of a "highly extensible resin"; that is a resin that can stretch during corrugation without fracture or loss of integrity. A "highly extensible resin" would be one that when cast into a film, would have an elongation at break of greater than 200%; more typically an elongation at break of 300% to 650%.

For the particular preferred corrugations characterized herein in Section II, a relatively thin media will be desirable, preferably no more than about 0.02 inches in thickness, most preferably within a range of 0.008 to 0.015 inches in thickness, when measured with a thickness gauge at 1.5 psi. Such a media thickness allows for high surface area of media within a relatively small volume, and also good workability in the corrugation process. The preferred media thickness as characterized were particularly selected for use with an air filter.

Permeability or efficiency of the media again will be a matter of choice for the environment of use. Media useable for air filtration, in corrugated systems according to the present invention, would include those having permeability of at least 10 fpm, typically 15 to 55 fpm, with typical environments of use involving use of preferred media having a permeability between 36 and 48 fpm. The permeability test for media is generally characterized in U.S. Pat. No. 5,672,399 at column 20, lines 27-39. In general, it is the media face velocity (air) required to induce a 0.50 inch water restriction across a flat sheet of the referenced material, media, or composite. Permeability, as used herein, can be assessed by a Frazier Perm Test, according to ASTM D 737 incorporated herein by reference, for example, using a Frazier Perm tester available from Frazier Precision Instrument Company, Gaithersburg, Md., or by some analogous test.

Basis weight for the media, again, will be in part be a matter of choice based on factors not only related to the corrugation. Typical media useable for air filtration in corrugated systems according to this disclosure would include those having a basis weight of less than about 60 lbs./3,000 ft$^2$, typically about 48-56 lb./3,000 ft.$^2$. The pore size would depend, again, upon factors more related to the filtration function and environment of use, than to the actual corrugation. Useable media for air filtration in corrugation systems according to this disclosure would typically have pore sizes of 64-80 microns. The dry tensile strength, in the machine direction, of typical, useable, media would be 17-23 lbs. per inch. The burst strength, wet off of the machine, would be 28-68 psi. The burst strength test in a wet burst after 1, 2, 3, and 5 minutes at 300° F. of typical, useable media would be a burst strength ratio of 0.7-0.9. The ratio is calculated by dividing the result of the wet off the machine burst strength by the average of the two highest values recorded from the cured test at 1, 2, 3, and 5 minutes.

The efficiency of the media chosen for use, again, will be a matter of choice, primarily depending upon the environment of use. Donaldson Company, the assignee of this disclosure, has evaluated for use in a corrugated form as described, a media which with fine fiber applied has an initial efficiency for 0.8 micron particles of at least 60% with a target range of at least 64%-70%.

In general, the sealant material used for creating the main upstream and downstream seals 57, 59 (FIG. 3) should be a material that will provide for a good reliable seal in order to close the flutes in the corrugated media 114a that are face down to the flat web 216. Sealant material selected will be a choice depending on equipment, line speeds, filtering characteristics, etc. Sealant material can include a pressure sensitive hot melt of medium to high viscosity; a hot melt bead; a foaming hot melt bead; or other suitable sealants, depending on the desired filter characteristics (e.g., weight, acceptable amount of pinhole leaks, etc.) commercially available. Commercial suppliers such as Bostik Findley of Wauwatosa, Wis., Product H2038; or Henkel Adhesives of Ambler, Pa.; or HB Fuller of St. Paul, Minn., can be used. The sealant material can be applied at a temperature suitable for the equipment, line speeds, etc., for example, 390° F.-400° F. Before application, the sealant can be gassed by, for example, adding sufficient nitrogen gas to foam the sealant such that it is about 70% solid.

In general, the adhesive material 226 for applying the tack beads, the lead end seal, and the trail end seal, should be a material sufficient for adhering the flat sheet to the corrugated web in the appropriate environment. The adhesive will be a matter of choice based on equipment, line speeds, filter properties, etc. Commercially available adhesives can be used including a polyamide hot melt. Sources such as: Bostik Findley of Wauwatosa, Wis.; or Henkel Adhesives of Ambler, Pa.; or HB Fuller of St. Paul, Minn.; or National Starch and Chemical Company of Bridgewater, N.J., Product HYPERM 34-3412 can be used. The adhesive may be applied at a temperature suitable for the equipment, line speeds, etc., for example, 350° F.-375° F.

VI. Flute Definition in General and Flute Definition Relative to PCT Publication WO 97/40918

Reference is again made to FIGS. 4-6 in which the example corrugated web 70 is shown. It has been found that each of the individual flutes for the example web configuration can, in part, be defined by the intended geometry of the flute ends (FIG. 4 and FIG. 5) or based on the corrugation roller definition. The media will substantially but not perfectly conform to the corrugation roller definition. However, no precise mathematical definition has been found for the flute shape of the corrugation roller, and thus the resulting media, between each of the flute ends. More precisely, it has been found that the flutes in the corrugated web 70 can be defined by the ends of each tooth of the corrugation roller of FIGS. 7-14 to the extent that the media holds the shape given by the corrugation rollers of FIGS. 7-14. Each of the teeth 116 and gullets 118 of the corrugation roller 110 can be geometrically described at its end surfaces (FIG. 10 and FIG. 11); however, the geometric shape in between each of the ends of the teeth 116 and gullets 118 has not been precisely, mathematically, defined. As described above, however, the teeth 116 and gullets 118 can be defined by the process used to generate the shape. As was described above, given the definition for the ends of each of the teeth 116, the extension between the end points (FIG. 10 and FIG. 11) can be defined by the surface created by: maintaining the same radial distance to the longitudinal axis of the workpiece 192 for (1) any given point on the wire electrode 182 spaced a first distance from the midpoint of the wire 182 (or a plane passing through a midpoint of the teeth 116) in the direction of one end 120 as (2) the point along the wire electrode 182 spaced that first distance from the midpoint of the wire 182 (or a plane passing through a midpoint of the teeth 116) in the direction of the other end 122. This process for creating the extension of each tooth between end 120 and end 122 is used to provide the definition of the preferred tapered shape of each of the teeth 116. If the media selected is, for example, one of the media formulations described herein, the media will hold adequately close to the same shape as the teeth 116 and gullets 118 of the corrugation rollers 110, 112, not only at the end points but also along the entire extension of the flutes, for performance advantage to be obtained. Thus, the defined process for generating the tooth configuration also provides the definition for the resulting corrugation in the corrugated web 70 at the flute ends and the flute extensions between the ends.

As indicated previously, because the media sheet put into corrugation process is somewhat flexible, it will not perfectly correspond to the roller tooth definition, after the corrugation process. By choosing preferred materials as defined, substantial correlation will result. The media formulation, including the properties provided by the resin, should be selected so the resulting corrugated product should have end ratios in which the area of the upstream peak 74 will be at least 20% of the area of the downstream peak 74, and typically 25%-50%. Further, the corrugated product should hold a taper along its length immediately after corrugation. The resulting corrugated product, and the resulting product when secured to a flat sheet and coiled into a filter element, has an appearance that is eye-catching and attractive, especially when viewing the ends of the flutes.

The concept of using tapered flutes is not new. As discussed above, in commonly assigned PCT publication WO 97/40918, it was described that using tapered flutes has advantages in filtering. In publication WO 97/40918, the ends of the flutes were pictured and shown to be, in general, rounded flutes that taper between one end and the other end. Also in PCT publication WO 97/40918, it was described that a corrugation roller could be used to make the tapered flutes described in that application. Upon further exploration, it has been learned that in order to preferably mass produce filter elements using tapered flutes, it is preferable and useful to use the preferred media formulations as described herein; with a mixture of cellulose and synthetic fibers; and, to use the particular type of corrugation rollers as described herein.

What is claimed is:

1. A corrugated sheet for use in filter media; the corrugated sheet comprising:
    (a) a first web of media comprising a blend of synthetic and cellulose fibers; said blend comprising no greater than 80% synthetic fibers, by fiber weight, and a remaining amount being cellulose fibers; said first web includes a resin content of at least 15%;
    (b) said first web having opposite first and second edges; said first web comprising a corrugated shape of alternating peaks and troughs; each of the peaks having a first peak end, a second peak end, and a peak extension between the first peak end and the second peak end; each of the troughs having a first trough end, a second trough end, and a trough extension between the first trough end and the second trough end; the alternating peaks and troughs forming a plurality of spaced flutes;
        (i) the trough of each flute decreasing in width, between adjacent peaks, from the first trough end to the second trough end;
        (ii) the peak of each flute increasing in width, between adjacent troughs, from the first peak end to the second peak end;
    wherein the first web comprises the blend of synthetic and cellulose fibers such that the media is both stretchable and retains the corrugated shape.

2. A corrugated sheet according to claim 1 wherein:
    (a) the first trough end of each flute has a first trough width, and the second trough end has a second trough width;
        (i) a ratio of the first trough width to the second trough width being at least 2:1; and
    (b) the first peak end has a first peak width, and the second peak end has a second peak width;
        (i) a ratio of the second peak width to the first peak width being at least 2:1.

3. A corrugated sheet according to claim 1 wherein:
    (a) the first trough end of each flute has a first trough width, and the second trough end has a second trough width;

(i) a ratio of the first trough width to the second trough width being within a range of 3:1-7:1, inclusive; and (b) the first peak end has a first peak width, and the second peak end has a second peak width;
    (i) a ratio of the second peak width to the first peak width being within a range of 3:1-7:1, inclusive.

4. A corrugated sheet according to claim 3 wherein:
(a) each flute has an angle of taper within a range of 0.25°-2° inclusive.

5. A corrugated sheet according to claim 1 wherein:
(a) said first peak end defines a first cross-sectional area;
(b) said second peak end defines a second cross-sectional area;
    (i) said first cross-sectional area being 25-50% of said second cross-sectional area.

6. A corrugated sheet according to claim 1 wherein:
(a) each of said peaks has first and second sloped sidewalls and a crest therebetween;
    (i) said first peak end having a radius of at least 0.2 inch at said crest; said first and second sloped sidewalls defining an angle of 8-12° therebetween at said first peak end;
    (ii) said second peak end having a radius of at least 0.25 inch at said crest; and
(b) each of said first peak end, second peak end, and peak extension has a uniform peak height of 0.1-0.25 inch.

7. A corrugated filter sheet according to claim 6 wherein:
(a) each of said first trough end, second trough end, and trough extension has a uniform depth equal to said peak height.

8. A corrugated sheet according to claim 1 wherein:
(a) said first web of media comprises 35%-75% synthetic fibers, by fiber weight, and a remaining amount being cellulose fibers.

9. A corrugated sheet according to claim 1 wherein:
(a) said first web of media comprises 45-60% synthetic fibers, by fiber weight, and a remaining amount being cellulose fibers.

10. A corrugated sheet according to claim 1 wherein:
(a) said first web includes:
    (i) a permeability of at least 15 cfm; and
    (ii) an average elongation in a machine direction of 4-7.5%.

11. A corrugated filter media structure comprising:
(a) a corrugated sheet including:
    (i) a first web of media comprising a blend of synthetic and cellulose fibers; said blend comprising no greater than 80% synthetic fibers, by fiber weight, and a remaining amount being cellulose fibers; said first web includes a resin content of at least 15%;
    (ii) said first web having opposite first and second edges; said first web comprising a corrugated shape of alternating peaks and troughs; each of the peaks having a first peak end, a second peak end, and a peak extension between the first peak end and the second peak end; each of the troughs having a first trough end, a second trough end, and a trough extension between the first trough end and the second trough end; the alternating peaks and troughs forming a plurality of spaced flutes;
        (A) the trough of each flute decreasing in width, between adjacent peaks, from the first trough end to the second trough end;
        (B) the peak of each flute increasing in width, between adjacent troughs, from the first peak end to the second peak end; and wherein the first web comprises the blend of synthetic and cellulose fibers such that the media is both stretchable and retains the corrugated shape;
(b) a second web of non-corrugated filter media oriented adjacent to said first web;
    (i) said second web of non-corrugated filter media being secured to said first web.

12. A corrugated filter media structure according to claim 11 wherein:
(a) alternating flutes are closed to passage of fluid therethrough at a location adjacent said first edge.

13. A corrugated filter media structure according to claim 11 wherein:
(a) said second web of non-corrugated filter media is secured to said first web of filter media by a sealant;
    (i) the sealant closing an area between said second web of non-corrugated filter media and said first peak ends.

14. A corrugated filter media structure according to claim 13 wherein:
(a) said second web of non-corrugated filter media secured to said first web of filter media is in a coiled configuration.

15. A corrugated filter media structure according to claim 12 wherein:
(a) said alternating flutes which are closed to passage of fluid therethrough at said location adjacent said first edge are open to passage of fluid therethrough at a location adjacent said second edge; and
(b) remaining ones of said flutes are closed to passage of fluid therethrough at a location adjacent to said second edge and open to passage of fluid therethrough at a location adjacent said first edge.

16. A corrugated filter media structure according to claim 15 wherein:
(a) sealant closes an area between said second web of non-corrugated media and said second trough ends along said second edge.

17. A corrugated sheet for use in filter media; the corrugated sheet comprising:
(a) a first web of media comprising an average elongation in a machine direction of at least 3.5%; the first web comprising a blend of synthetic and cellulose fibers; said first web includes a resin content of at least 15%;
(b) said first web having opposite first and second edges; said first web comprising a corrugated shape of alternating peaks and troughs; each of the peaks having a first peak end, a second peak end, and a peak extension between the first peak end and the second peak end; each of the troughs having a first trough end, a second trough end, and a trough extension between the first trough end and the second trough end; the alternating peaks and troughs forming a plurality of spaced flutes;
    (i) the trough of each flute decreasing in width, between adjacent peaks, from the first trough end to the second trough end;
    (ii) the peak of each flute increasing in width, between adjacent troughs, from the first peak end to the second peak end;
    wherein the first web comprises the blend of synthetic and cellulose fibers such that the media is both stretchable and retains the corrugated shape.

18. A corrugated sheet according to claim 17 wherein:
(a) each of said peaks has first and second sloped sidewalls and a crest therebetween;

(i) said first peak end having a radius of at least 0.2 inch at said crest; said first and second sloped sidewalls defining an angle of 8-12° therebetween at said first peak end;
(ii) said second peak end having a radius of at least 0.25 inch at said crest; and
(b) each of said first peak end, second peak end, and peak extension has a uniform peak height of 0.1-0.25 inch.

19. A corrugated filter sheet according to claim 18 wherein:
(a) each of said first trough end, second trough end, and trough extension has a uniform depth equal to said peak height.

20. A corrugated sheet according to claim 17 wherein:
(a) said first web of media comprises 35%-75% synthetic fibers, by fiber weight, and a remaining amount being cellulose fibers.

21. A corrugated sheet according to claim 17 wherein:
(a) said first web of media comprises 45-60% synthetic fibers, by fiber weight, and a remaining amount being cellulose fibers.

22. A corrugated sheet according to claim 17 wherein:
(a) said first web of media comprises:
(i) at least 30% synthetic fibers, by fiber weight, and a remaining amount being cellulose fibers;
(ii) a permeability of at least 15 cfm; and
(iii) an average elongation in a machine direction of 4-7.5%.

23. A corrugated filter media structure comprising:
(a) a corrugated sheet including:
(i) a first web of media comprising an average elongation in a machine direction of at least 3.5%; the first web comprising a blend of synthetic and cellulose fibers; said first web includes a resin content of at least 15%;
(ii) said first web having opposite first and second edges; said first web comprising a corrugated shape of alternating peaks and troughs; each of the peaks having a first peak end, a second peak end, and a peak extension between the first peak end and the second peak end; each of the troughs having a first trough end, a second trough end, and a trough extension between the first trough end and the second trough end; the alternating peaks and troughs forming a plurality of spaced flutes;
(A) the trough of each flute decreasing in width, between adjacent peaks, from the first trough end to the second trough end;
(B) the peak of each flute increasing in width, between adjacent troughs, from the first peak end to the second peak end; and
wherein the first web comprises the blend of synthetic and cellulose fibers such that the media is both stretchable and retains the corrugated shape;
(b) a second web of non-corrugated filter media oriented adjacent to said first web;
(i) said second web of non-corrugated filter media being secured to said first web.

24. A corrugated filter media structure according to claim 23 wherein:
(a) alternating flutes are closed to passage of fluid therethrough at a location adjacent said first edge.

25. A corrugated filter media structure according to claim 23 wherein:
(a) said second web of non-corrugated filter media is secured to said first web of filter media by a sealant;
(i) the sealant closing an area between said second web of non-corrugated filter media and said first peak ends.

26. A corrugated filter media structure according to claim 25 wherein:
(a) said second web of non-corrugated filter media secured to said first web of filter media is in a coiled configuration.

27. A corrugated filter media structure according to claim 24 wherein:
(a) said alternating flutes which are closed to passage of fluid therethrough at said location adjacent said first edge are open to passage of fluid therethrough at a location adjacent said second edge; and
(b) remaining ones of said flutes are closed to passage of fluid therethrough at a location adjacent to said second edge and open to passage of fluid therethrough at a location adjacent said first edge.

28. A corrugated filter media structure according to claim 27 wherein:
(a) sealant closes an area between said second web of non-corrugated media and said second trough ends along said second edge.

* * * * *